US011471834B2

(12) United States Patent
Okamura

(10) Patent No.: US 11,471,834 B2
(45) Date of Patent: *Oct. 18, 2022

(54) FILTRATION METHOD USING POROUS MEMBRANE

(71) Applicant: ASAHI KASEI KABUSHIKI KAISHA, Tokyo (JP)

(72) Inventor: Daisuke Okamura, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 132 days.

This patent is subject to a terminal disclaimer.

(21) Appl. No.: 16/631,239

(22) PCT Filed: Sep. 4, 2018

(86) PCT No.: PCT/JP2018/032736
§ 371 (c)(1),
(2) Date: Jan. 15, 2020

(87) PCT Pub. No.: WO2019/049857
PCT Pub. Date: Mar. 14, 2019

(65) Prior Publication Data
US 2020/0215492 A1    Jul. 9, 2020

(30) Foreign Application Priority Data
Sep. 7, 2017    (JP) .............................. JP2017-171972

(51) Int. Cl.
*B01D 65/02*    (2006.01)
*B01D 61/02*    (2006.01)
(Continued)

(52) U.S. Cl.
CPC ........... *B01D 65/02* (2013.01); *B01D 61/025* (2013.01); *B01D 61/145* (2013.01);
(Continued)

(58) Field of Classification Search
None
See application file for complete search history.

(56) References Cited

U.S. PATENT DOCUMENTS 4,879,041 A * 11/1989 Kurokawa ........... B01D 61/364
 210/640
6,322,703 B1 * 11/2001 Taniguchi ............ B01D 63/025
 210/636
(Continued)

FOREIGN PATENT DOCUMENTS

CN    102527250    7/2012
CN    102764597    11/2012
(Continued)

OTHER PUBLICATIONS

International Search Report issued in International Patent Application No. PCT/JP2018/032736, dated Dec. 4, 2018 with an English translation.
(Continued)

*Primary Examiner* — Jason M Greene
*Assistant Examiner* — Eric J McCullough
(74) *Attorney, Agent, or Firm* — Greenblum & Bernstein, P.L.C.

(57) ABSTRACT

Provided is a filtration method that includes a cleaning step and involves the use of a porous membrane, wherein the filtration method offers exceptional resistance to cleaning solutions (chemicals) (chemical liquid resistance) and exceptional filtration performance, and has a long service life. A filtration method includes the following steps: a filtration step in which a liquid to be processed that contains a material to be filtered is passed through a porous membrane configured from a resin having a three-dimensional mesh structure, and a filtrate is separated from the material to be filtered; and a cleaning step in which the porous
(Continued)

membrane has a cleaning solution passed therethrough or is immersed in the cleaning solution so that the interior of the porous membrane is cleaned.

19 Claims, 6 Drawing Sheets

(51) Int. Cl.
| | | |
|---|---|---|
| *B01D 61/14* | (2006.01) | |
| *B01D 61/58* | (2006.01) | |
| *B01D 69/08* | (2006.01) | |
| *B01D 71/34* | (2006.01) | |
| *B01D 71/36* | (2006.01) | |
| *C02F 1/44* | (2006.01) | |
| *C08J 9/26* | (2006.01) | |
| *C02F 103/08* | (2006.01) | |

(52) U.S. Cl.
CPC .......... *B01D 61/147* (2013.01); *B01D 61/58* (2013.01); *B01D 69/08* (2013.01); *B01D 71/34* (2013.01); *B01D 71/36* (2013.01); *C02F 1/441* (2013.01); *C02F 1/444* (2013.01); *C08J 9/26* (2013.01); *C02F 2103/08* (2013.01); *C02F 2303/16* (2013.01); *C08J 2201/044* (2013.01); *C08J 2323/08* (2013.01); *C08J 2327/12* (2013.01); *C08J 2327/16* (2013.01); *C08J 2327/18* (2013.01)

(56) References Cited

U.S. PATENT DOCUMENTS

| | | | |
|---|---|---|---|
| 2010/0133184 A1* | 6/2010 | Gojo | ............ C11D 7/265 |
| | | | 210/636 |
| 2011/0239865 A1 | 10/2011 | Huang et al. | |
| 2016/0089638 A1 | 3/2016 | Schuster et al. | |

FOREIGN PATENT DOCUMENTS

| | | |
|---|---|---|
| JP | 2011-168741 | 9/2011 |
| JP | 2012-40461 | 3/2012 |
| JP | 2012-511413 | 5/2012 |
| JP | 2016-523698 | 8/2016 |
| WO | 2008/120509 | 10/2008 |
| WO | 2017/155004 | 9/2017 |

OTHER PUBLICATIONS

International Preliminary Report of Patentability issued in International Patent Application No. PCT/JP2018/032736, dated Mar. 10, 2020 with an English translation thereof.
Written Opinion of the International Searching Authority issued in International Application No. PCT/JP2018/032736, dated Dec. 4, 2018 with an English translation thereof.

* cited by examiner

FILTRATION METHOD USING POROUS MEMBRANE

FIELD

The present invention relates to a filtration method using a porous membrane and including a cleaning step. More specifically, the present invention relates to a filtration method ensuring excellent resistance to a cleaning solution (chemical solution) in a filtration method using a porous membrane and including a cleaning step.

BACKGROUND

For example, a tap water treatment for obtaining drinking water or industrial water from natural water sources such as seawater, river water, lake and marsh water and underground water, which are suspended water, or a sewage treatment for treating domestic drainage such as sewage water to produce recycled water and obtain dischargeable clarified water, requires a solid-liquid separation operation (clarification operation) so as to separate and remove suspended matter. In such a clarification operation, with respect to the tap water treatment, suspended matter (e.g., clay, colloid, bacteria) derived from natural water sources as suspended water are removed, and with respect to the sewage treatment, suspended matter (e.g., sludge) in treated water after biological treatment (secondary treatment) with suspended matter, activated sludge, etc. in sewage water are removed.

Conventionally, these clarification operations have been performed mainly by a pressure flotation method, a precipitation method, a sand filtration method, a coagulation, sedimentation and sand filtration method, etc., but recently, a membrane filtration method is spreading instead of these methods. The advantage of the membrane filtration method includes, for example, (1) the clarification level of the obtained water quality is high and stable (safety of the obtained water is high); (2) the installation space of a filtration apparatus can be small; and (3) an automatic operation is easy. For example, in the pretreatment of seawater desalination reverse osmosis filtration, a membrane filtration method is used as a substitute for or a latter step of the pressure flotation method so as to further improve the water quality of treated water subjected to pressure flotation treatment. In the clarification operation by such membrane filtration, a flat membrane or a hollow fiber porous ultrafiltration or microfiltration membrane, having an average pore size of several nm to several hundred nm, is used.

In this way, the clarification operation by the membrane filtration method has many advantages that the above-described conventional pressure flotation method, sand filtration method, etc. do not have, and its spread to seawater desalination pretreatment, etc. is being encouraged. In addition, an organic membrane composed of a resin described in Patent Literature 1 below is often used as the porous membrane.

CITATION LIST

Patent Literature

[PTL 1] Kokai (Japanese Unexamined Patent Publication) No. 2011-168741

SUMMARY

Technical Problem

As described above, an organic membrane composed of a resin is often used as a porous membrane, but at the time of manufacture of a porous filtration membrane from a resin material, if the membrane production method differs, a difference emerges in the microstructure of the material constituting the membrane. Usually, when a filtration operation is continued, the membrane is clogged and therefore, the operation of a filtration method using a porous filtration membrane involves a cleaning step. On the other hand, when a chemical is used in the cleaning step, strength deterioration of the membrane is induced. At this time, if there is a difference in the microstructure of the material constituting the porous filtration membrane, the degree of damage to the porous filtration membrane by a cleaning solution (chemical solution) used in the repeated cleaning step differs, which disadvantageously affects the filtration performance or life.

In consideration of such a problem, the issue to be solved by the present invention is to provide a filtration method ensuring excellent chemical resistance and filtration performance and an enhanced life in a filtration method using a porous filtration membrane and including a cleaning step using a cleaning solution (chemical solution).

Solution to Problem

As a result of intensive studies and many experiments to solve the problem above, the present inventors have unexpectedly found that when a membrane having good pore continuity from the outer side of membrane, which is a to-be-treated liquid side of a porous filtration membrane, to the inner side of the membrane, which is a filtrate side, is used, even in the case of using a strong oxidizing agent such as oxygen-based oxidizing agent having a standard electrode potential of 1 V or more for a cleaning solution (chemical solution) used in the cleaning step, the deterioration of the membrane can be kept to a minimum. The present invention has been accomplished based on this finding.

That is, the present invention is as follows.

[1] A filtration method including the following steps:

a filtration step of passing a to-be-treated liquid containing a to-be-filtered material through a porous membrane composed of a resin having a three-dimensional network structure to separate a filtrate from the to-be-filtered material; and a cleaning step of passing or soaking the porous membrane into a cleaning solution to clean the inside of the porous membrane; wherein on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 1 $\mu m^2$ or less is 70% or more relative to the total area of resin parts, and the cleaning solution contains an oxygen-based oxidizing agent having a standard electrode potential of 1 V or more.

[2] A filtration method including the following steps:

a filtration step of passing a to-be-treated liquid containing a to-be-filtered material through a porous membrane composed of a resin having a three-dimensional network structure to separate a filtrate from the to-be-filtered material; and a cleaning step of passing or soaking the porous membrane into a cleaning solution to clean the inside of the porous membrane; wherein on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 10 μm² or more is 15% or less relative to the total area of resin parts, and the cleaning solution contains an oxygen-based oxidizing agent having a standard electrode potential of 1 V or more.

[3] A filtration method including the following steps:

a filtration step of passing a to-be-treated liquid containing a to-be-filtered material through a porous membrane composed of a resin having a three-dimensional network structure to separate a filtrate from the to-be-filtered material; and a cleaning step of passing or soaking the porous membrane into a cleaning solution to clean the inside of the porous membrane; wherein on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 1 μm² or less is 70% or more relative to the total area of resin parts and the total of areas of resin parts having an area of 10 μm² or more is 15% or less relative to the total area of resin parts, and the cleaning solution contains an oxygen-based oxidizing agent having a standard electrode potential of 1 V or more.

[4] The filtration method according to any one of [1] to [3] above, wherein on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of more than 1 μm² and less than 10 μm² is 15% or less relative to the total area of resin parts.

[5] The filtration method according to any one of [1] to [4] above, wherein the surface opening ratio of the porous membrane is from 25 to 60%.

[6] The filtration method according to any one of [1] to [5] above, wherein the relationship between the tensile elongation at break E0 of the porous membrane before the cleaning step and the tensile elongation at break E1 of the porous membrane after the cleaning step is E1/E0×100≥80%.

[7] The filtration method according to any one of [1] to [5] above, wherein the relationship between the tensile elongation at break E0 of the porous membrane before the cleaning step and the tensile elongation at break EX of the porous membrane after repeating the cleaning step X times (X is an integer of 2 to 100) is EX/E0×100≥70%.

[8] The filtration method according to any one of [1] to [7] above, wherein the relationship between the flux L0 of the porous membrane before the filtration step and the flux L1 of the porous membrane after the cleaning step is 105%≥L1/L0×100≥95%.

[9] The filtration method according to any one of [1] to [7] above, wherein the relationship between the flux L0 of the porous membrane before the filtration step and the flux LX of the porous membrane after repeating the cleaning step X times (X is an integer of 2 to 100) is 110%≥LX/L0×100≥90%.

[10] The filtration method according to any one of [1] to [9] above, wherein the porous membrane is a hollow fiber membrane.

[11] The filtration method according to any one of [1] to [10] above, wherein the resin constituting the porous membrane is a thermoplastic resin.

[12] The filtration method according to [11] above, wherein the thermoplastic resin is a fluororesin.

[13] The filtration method according to [12] above, wherein the fluororesin is selected from the group consisting of a vinylidene fluoride resin (PVDF), a chlorotrifluoroethylene resin, a tetrafluoroethylene resin, an ethylene-tetrafluoroethylene copolymer (ETFE), an ethylene-monochlorotrifluoroethylene copolymer (ECTFE), a hexafluoropropylene resin, and a mixture of these resins.

[14] The filtration method according to any one of [1] to [13] above, wherein the to-be-treated liquid is seawater.

[15] The filtration method according to any one of [1] to [14] above, wherein the oxygen-based oxidizing agent having a standard electrode potential of 1 V or more is an aqueous Fenton reaction reagent solution by at least one member selected from the group consisting of ozone, hydrogen peroxide, percarbonate and persulfate.

[16] The filtration method according to [15] above, wherein the aqueous Fenton reaction reagent solution contains 0.005 wt % or more of iron(II) ion and 0.5 wt % or more of an oxygen-based oxidizing agent and has a pH of 7 or less.

[17] The filtration method according to [16] above, wherein the aqueous Fenton reaction reagent solution contains 0.005 wt % or more of iron(II) ion and 1.0 wt/o or more of hydrogen peroxide and has a pH of 4 or less.

[18] The filtration method according to any one of [15] to [17] above, wherein the pH of the aqueous Fenton reaction reagent solution is adjusted with an organic acid.

[19] The filtration method according to [18] above, wherein the organic acid is selected from the group consisting of malic acid, oxalic acid, citric acid, tartaric acid, and lactic acid.

[20] A method for operating a filtration system, including the following steps:

a permeate production step employing a filtration system including a microfiltration (MF) or ultrafiltration (UF) unit using a porous membrane and a reverse osmosis (RO) unit; and a regeneration step of the filtration system;

wherein the permeate production step includes the following steps:

a filtration step of passing a to-be-treated liquid containing a to-be-filtered material through a porous membrane composed of a resin having a three-dimensional network structure to separate a filtrate by MF or UF from the to-be-filtered material, in which on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 1 μm² or less is 70% or more relative to the total area of resin parts, and/or on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 10 μm² or more is 15% or less relative to the total area of resin parts, and a step of purifying the obtained filtrate by means of the RO unit:

the regeneration step of the filtration system includes the following steps:

a cleaning step of passing or soaking the porous membrane into a cleaning solution to clean the inside of the porous membrane, in which the cleaning solution contains an oxygen-based oxidizing agent having a standard electrode potential of 1.8 V or more; and a rinsing step of rinsing the cleaning solution remaining inside the porous membrane by using 10 L of a rinse water per the membrane area of 1 m² of the porous membrane; and the concentration of the oxygen-based oxidizing agent in the filtrate at the time of resuming the filtration step after the rinsing step is 1 mg/L or less.

[21] The operation method of a filtration system according to 1201 above, wherein the surface opening ratio of the porous membrane is from 25 to 60%.

[22] The operation method of a filtration system according to [20] or [21] above, wherein the relationship between the tensile elongation at break E0 of the porous membrane before the cleaning step and the tensile elongation at break E1 of the porous membrane after the cleaning step is E1/E0×100≥80%.

[23] The operation method of a filtration system according to any one of [20] to [22] above, wherein the relationship between the tensile elongation at break E0 of the porous membrane before the cleaning step and the tensile elongation at break EX of the porous membrane after repeating the cleaning step X times (X is an integer of 2 to 100) is EX/E0×100≥70%.

[24] The operation method of a filtration system according to any one of [20] to [23] above, wherein the relationship between the flux L0 of the porous membrane before the filtration step and the flux L of the porous membrane after the cleaning step is 105%≥L1/L0×100≥95%.

[25] The operation method of a filtration system according to any one of [20] to [24] above, wherein the relationship between the flux L0 of the porous membrane before the filtration step and the flux LX of the porous membrane after repeating the cleaning step X times (X is an integer of 2 to 100) is 110% LX/L0×100≥90%.

[26] The operation method of a filtration system according to any one of [20] to [25] above, wherein the porous membrane is a hollow fiber membrane.

[27] The operation method of a filtration system according to any one of [20] to [27] above, wherein the resin constituting the porous membrane is a thermoplastic resin.

[28] The operation method of a filtration system according to [27] above, wherein the thermoplastic resin is a fluororesin.

[29] The operation method of a filtration system according to [28] above, wherein the fluororesin is selected from the group consisting of a vinylidene fluoride resin (PVDF), a chlorotrifluoroethylene resin, a tetrafluoroethylene resin, an ethylene-tetrafluoroethylene copolymer (ETFE), an ethylene-monochlorotrifluoroethylene copolymer (ECTFE), a hexafluoropropylene resin, and a mixture of these resins.

[30] The operation method of a filtration system according to any one of [20] to [29] above, wherein the to-be-treated liquid is seawater.

[31] The operation method of a filtration system according to any one of [20] to [30] above, wherein the oxygen-based oxidizing agent having a standard electrode potential of 1.8 V or more is an aqueous Fenton reaction reagent solution by at least one member selected from the group consisting of ozone, hydrogen peroxide, percarbonate and persulfate.

[32] The operation method of a filtration system according to [31] above, wherein the aqueous Fenton reaction reagent solution contains 0.005 wt % or more of iron(II) ion and 0.5 wt % or more of an oxygen-based oxidizing agent and has a pH of 7 or less.

[33] The operation method of a filtration system according to [32] above, wherein the aqueous Fenton reaction reagent solution contains 0.005 wt % or more of iron(II) ion and 1.0 wt % or more of an oxygen-based oxidizing agent and has a pH of 4 or less.

[34] The operation method of a filtration system according to any one of [31] to [33] above, wherein the pH of the aqueous Fenton reaction reagent solution is adjusted with an organic acid.

[35] The operation method of a filtration system according to [34] above, wherein the organic acid is selected from the group consisting of malic acid, oxalic acid, citric acid, tartaric acid, and lactic acid.

Advantageous Effects of Invention

The filtration method according to the present invention uses a membrane having good pore continuity from the outer side of membrane, which is a to-be-treated liquid side of a porous filtration membrane, to the inner side of the membrane, which is a filtrate side, so that in the case of using a strong oxidizing agent such as oxygen-based oxidizing agent having a standard electrode potential of 1 V or more for a cleaning solution (chemical solution) used in the cleaning step, the deterioration of the membrane can be kept to a minimum, and therefore, this is a filtration method ensuring excellent chemical resistance and filtration performance and an enhanced life in a filtration method using a porous filtration membrane and including a cleaning step using an oxygen-based oxidizing agent having a standard electrode potential of 1 V or more.

DESCRIPTION OF EMBODIMENTS

Figure 1:
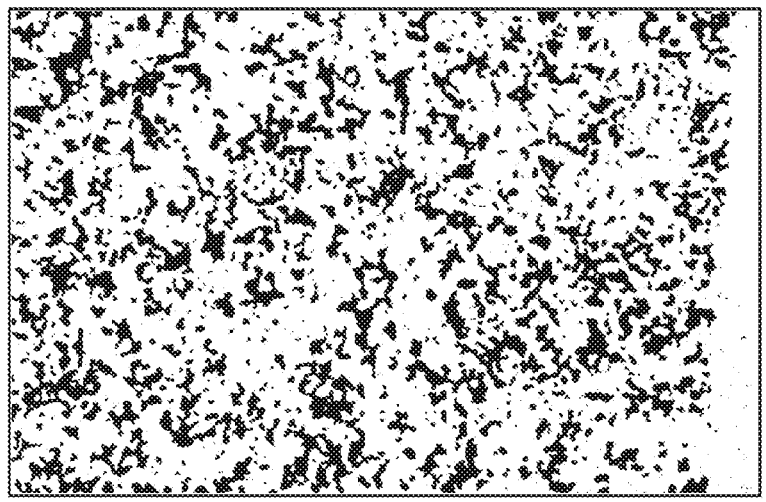
FIG. 1 is one example of an SEM image of a cross-section of a porous membrane used in the filtration method of the present embodiment (the black portion and the white portion indicate a resin and a pore (open pore), respectively).
Figure 2:
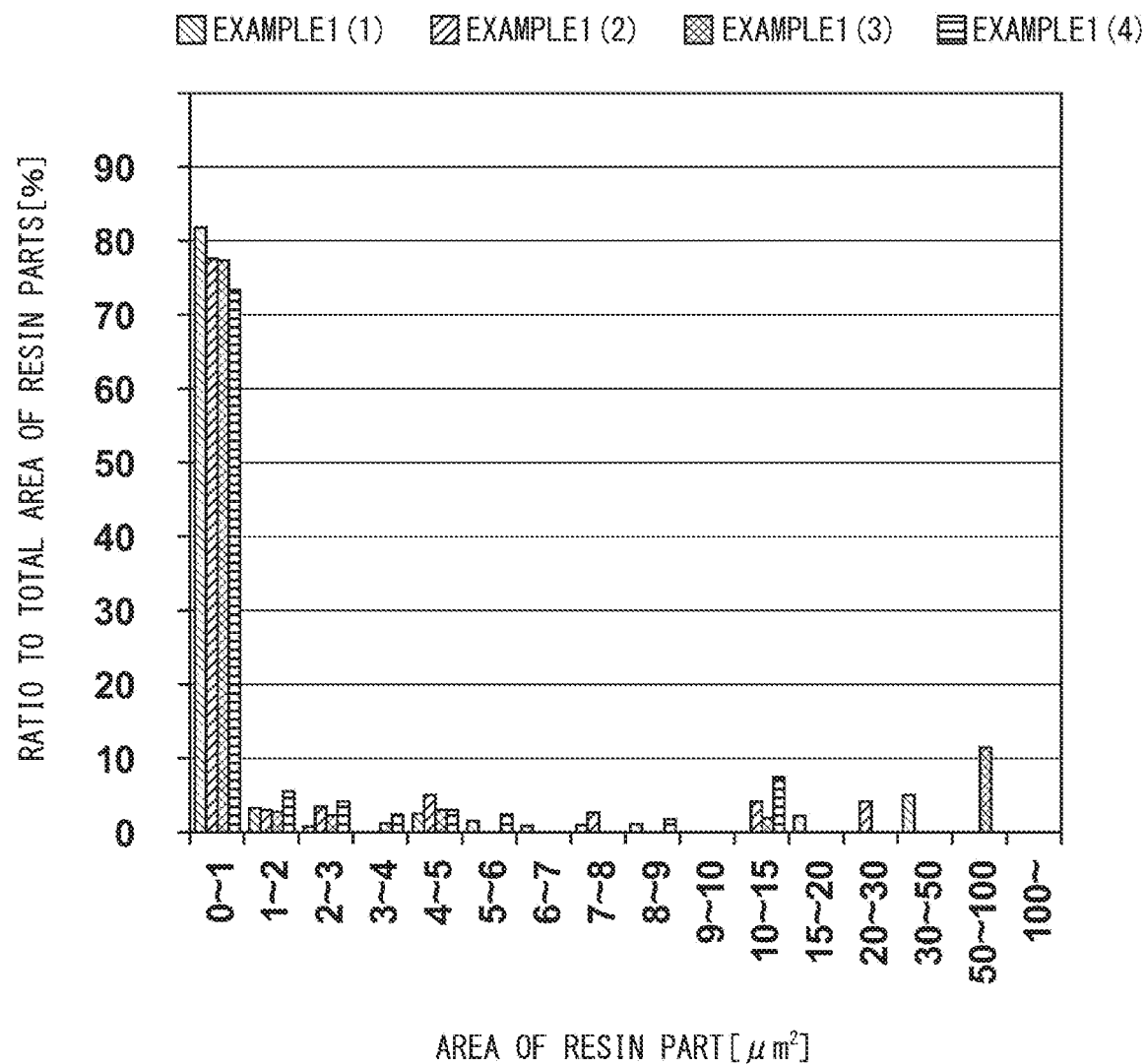
FIG. 2 is a histogram illustrating the ratio (%) of the total of areas of resin parts each having a predetermined area to the total area of resin parts, on an SEM image of a membrane cross-section in the membrane thickness direction perpendicular to an inner surface of the porous membrane used in Example 1, in each region (circled numbers 1 to 4) of a total of 4 visual fields with a visual field including the inner surface, a visual field including an outer surface of the membrane, and two visual fields photographed at regular intervals between those visual fields.
Figure 3:
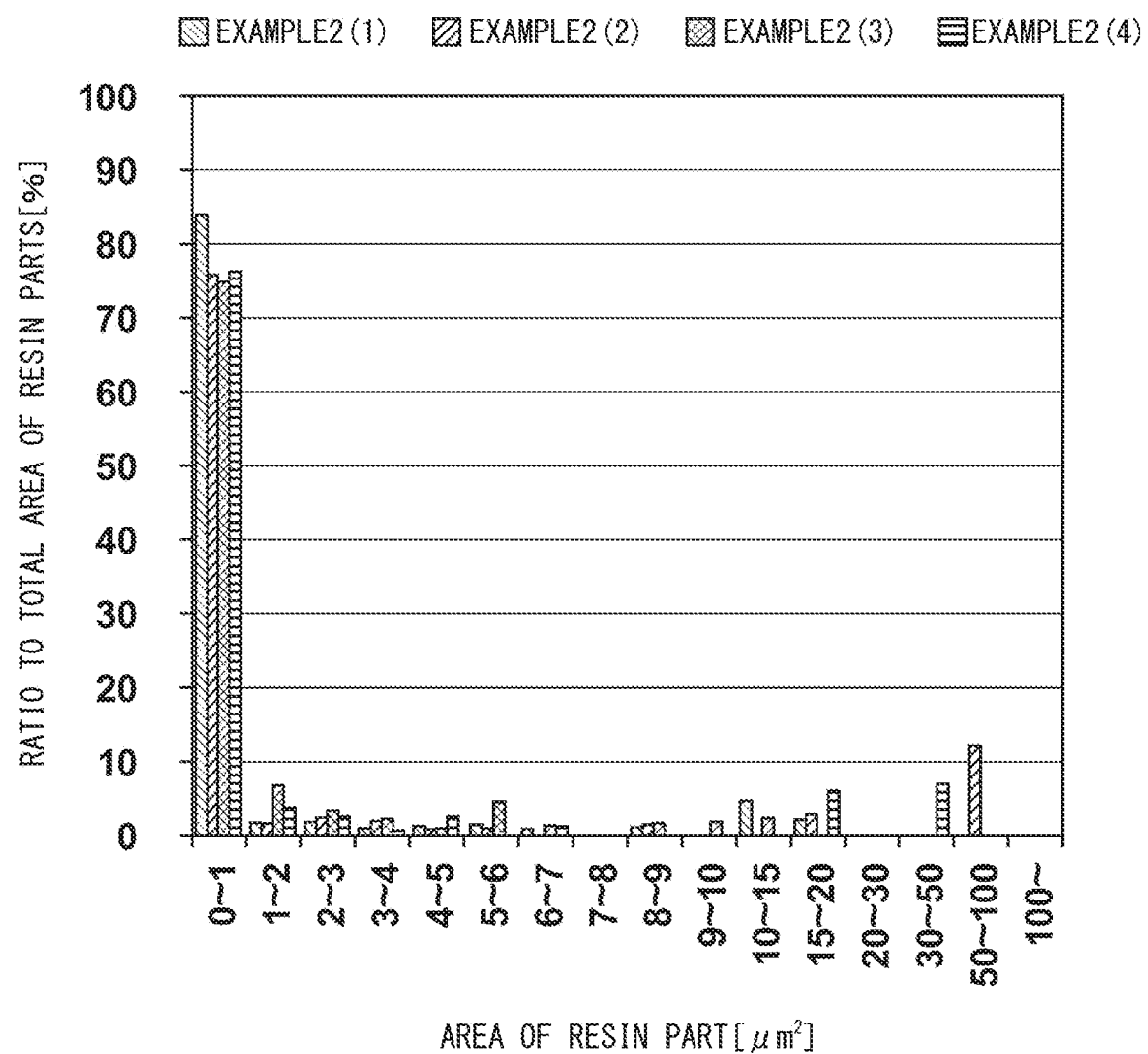
FIG. 3 is a histogram illustrating the ratio (%) of the total of areas of resin parts each having a predetermined area to the total area of resin parts, on an SEM image of a membrane cross-section in the membrane thickness direction perpendicular to an inner surface of the porous membrane used in Example 2, in each region (circled numbers 1 to 4) of a total of 4 visual fields with a visual field including the inner surface, a visual field including an outer surface of the membrane, and two visual fields photographed at regular intervals between those visual fields.
Figure 4:
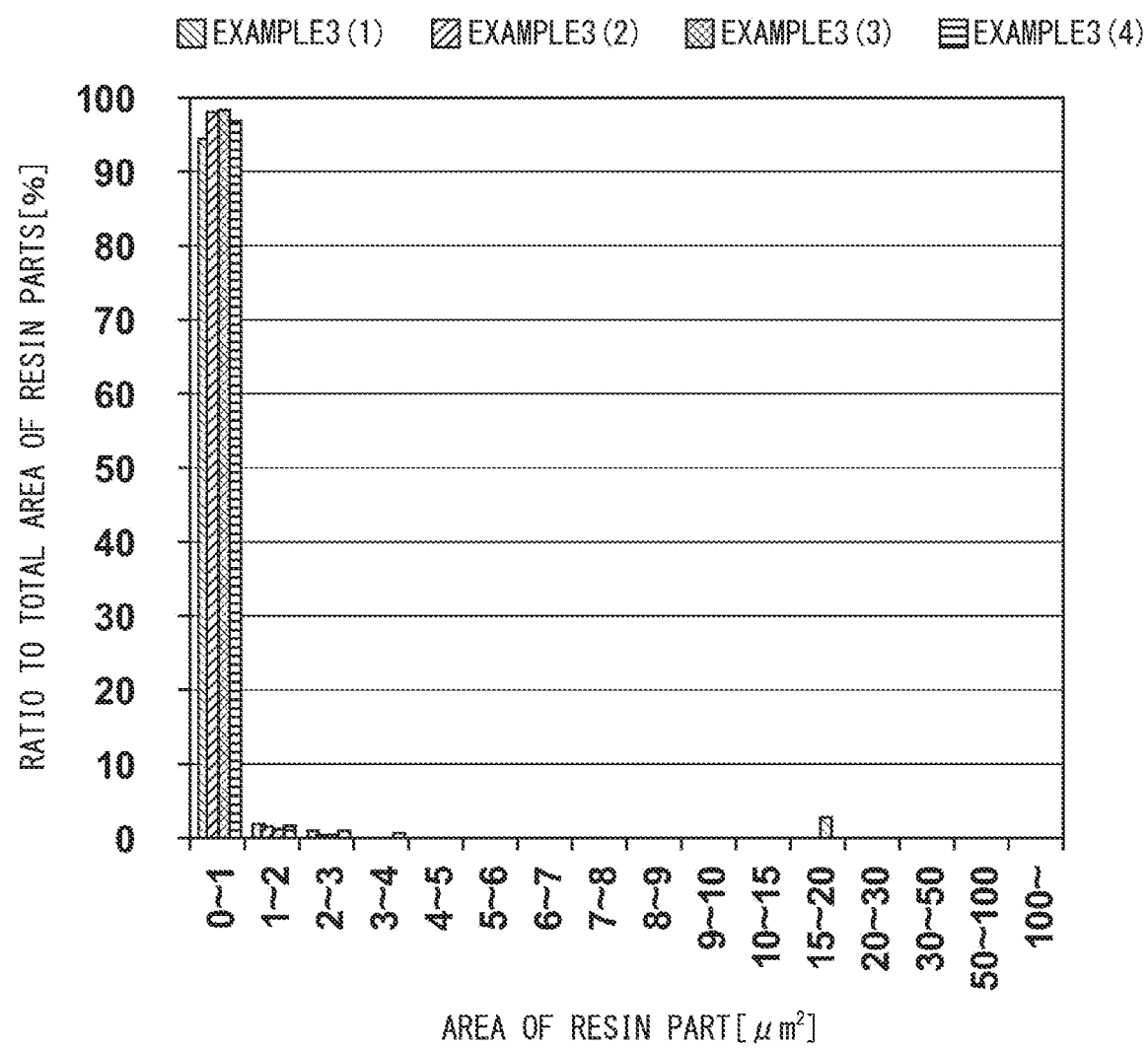
FIG. 4 is a histogram illustrating the ratio (%) of the total of areas of resin parts each having a predetermined area to the total area of resin parts, on an SEM image of a membrane cross-section in the membrane thickness direction perpendicular to an inner surface of the porous membrane used in Example 3, in each region (circled numbers 1 to 4) of a total of 4 visual fields with a visual field including the inner surface, a visual field including an outer surface of the membrane, and two visual fields photographed at regular intervals between those visual fields.
Figure 5:
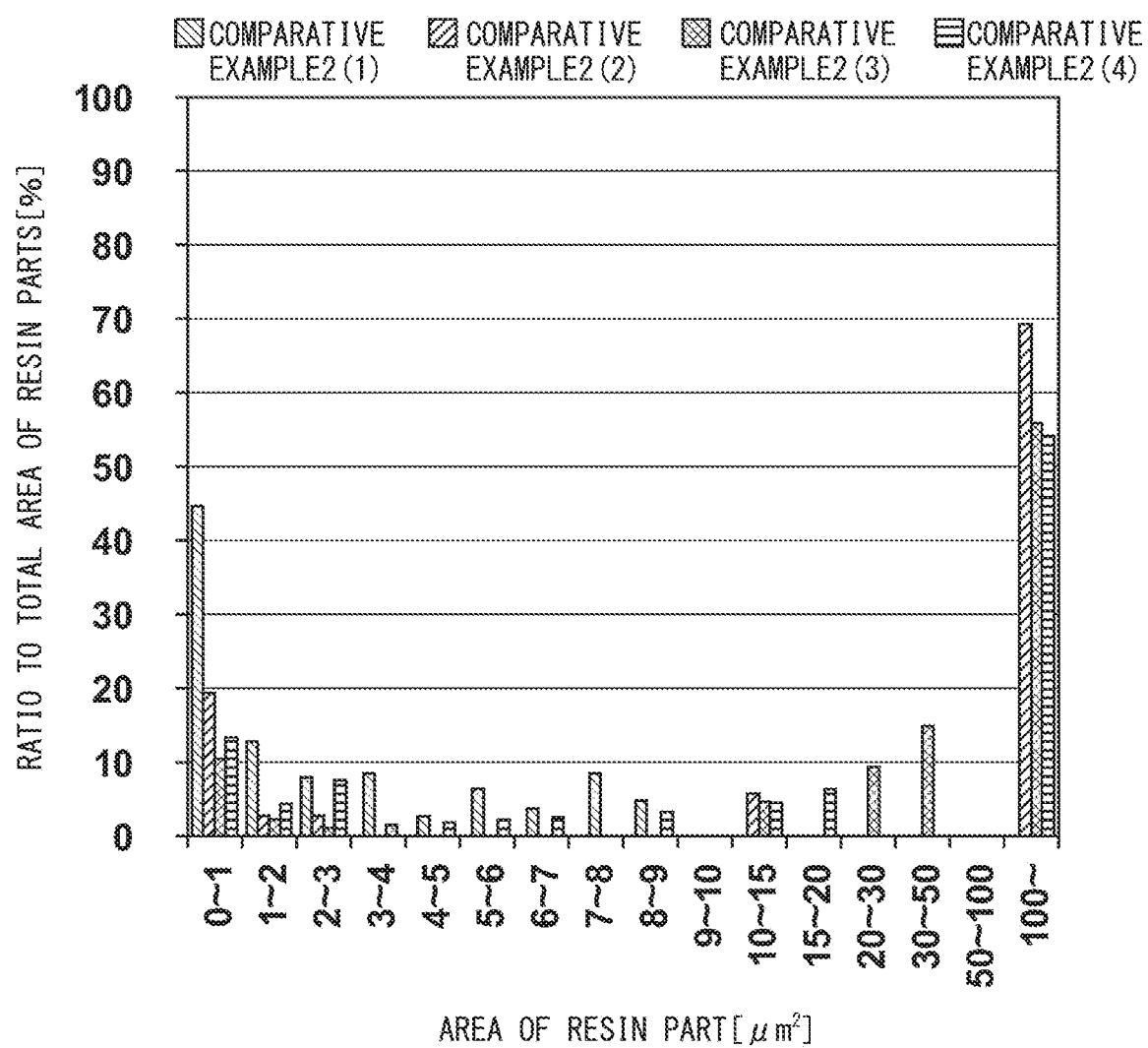
FIG. 5 is a histogram illustrating the ratio (%) of the total of areas of resin parts each having a predetermined area to the total area of resin parts, on an SEM image of a membrane cross-section in the membrane thickness direction perpendicular to an inner surface of the porous membrane used in Comparative Example 2, in each region (circled numbers 1 to 4) of a total of 4 visual fields with a visual field including the inner surface, a visual field including an outer surface of the membrane, and two visual fields photographed at regular intervals between those visual fields.

The embodiment of the present invention (hereinafter, sometimes referred to as the present embodiment) is described in detail below. Incidentally, the present invention is not limited to the present embodiment.

A first embodiment of the present embodiment is a filtration method including the following steps:

a filtration step of passing a to-be-treated liquid containing a to-be-filtered material through a porous membrane composed of a resin having a three-dimensional network structure to separate a filtrate from the to-be-filtered material; and a cleaning step of passing or soaking the porous membrane into a cleaning solution to clean the inside of the porous membrane; wherein on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 1 $\mu m^2$ or less is 70% or more relative to the total area of resin parts, and/or on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 10 $\mu m^2$ or more is 15% or less relative to the total area of resin parts, and the cleaning solution contains an oxygen-based oxidizing agent having a standard electrode potential of 1 V or more.

<Filtration Method>

The filtration method of the present embodiment is a filtration method including: a filtration step of passing a to-be-treated liquid containing a to-be-filtered material through a porous membrane composed of a resin having a three-dimensional network structure to separate a filtrate from the to-be-filtered material; and a cleaning step of passing a cleaning solution through the porous membrane to clean the inside of the porous membrane.

The shape of the porous membrane is not particularly limited, and the membrane may be a flat membrane, a tubular membrane, or a hollow fiber membrane, but in view of space saving of the filtration apparatus, that is, for the reason that the membrane area per unit volume of the membrane module can be increased, a hollow fiber membrane is preferred.

The filtration step in the filtration method of the present embodiment may be, for example, a so-called internal pressure filtration step in which a to-be-treated liquid containing a to-be-filtered material is supplied to a hollow part (inner surface) of a porous hollow fiber membrane and allowed to pass through a thick membrane (thick wall) part of the porous hollow fiber membrane and a liquid leached from the outer surface of the porous hollow fiber membrane is taken out as a filtrate, or may be a so-called external pressure filtration step in which a to-be-treated liquid is supplied from the outer surface of the porous hollow fiber membrane and the liquid leached from the inner surface of the porous hollow fiber membrane is taken out via the hollow part.

In the present description, the term "inside of the porous membrane" indicates a thick membrane (thick wall) par in which a large number of pores are formed.

In the present description, the term "a to-be-filtered material" indicates a material contained in a to-be-treated liquid and supplied to a porous membrane in the filtration step, and a material to be removed by the filtration and to be separated from a filtrate.

The cleaning step in the filtration method of the present embodiment includes a step of cleaning process of passing or soaking the porous membrane into an oxygen-based oxidizing agent having a standard electrode potential of 1 V or more, serving as a cleaning solution, to clean the inside of the porous membrane. The cleaning process includes, for example, water backwashing of separating and removing an attachment (to-be-filtered material) from the filtration surface (to-be-treated liquid supply-side surface) by passing a cleaning solution in a direction opposite the flowing direction of the to-be-treated water in the filtration step, that is, from the filtrate side to the to-be-treated water side, and air scrubbing of shaking the porous membrane with air to shake out the to-be-filtered material attached to the porous membrane.

In the present embodiment, an oxygen-based oxidizing agent having a standard electrode potential of 1 V or more, preferably an aqueous Fenton reaction reagent solution by at least one member selected from the group consisting of ozone, hydrogen peroxide, percarbonate and persulfate, is used as the cleaning solution. The oxygen-based oxidizing agent having a standard electrode potential of 1 V or more is more preferably an oxygen-based oxidizing agent of 1.5 V or more, still more preferably 1.7 V or more, yet still more preferably 1.8 V or more. As the standard electrode potential is higher, the oxidizing power is stronger, and a contamination attached to the membrane is more easily decomposed. The Fenton's reagent is a solution of hydrogen peroxide and an iron catalyst and is generally used for oxidation of a contaminant or industrial wastewater. The Fenton's reagent can also be used for decomposition of an organic compound such as trichloroethylene (TCE) and tetrachloroethylene (PCE). The iron(II) ion is oxidized by hydrogen peroxide to iron(III) ion, and a hydroxyl radical and a hydroxide ion are produced ($Fe^{2+}+H_2O_2 \rightarrow Fe^{3+}+OH+OH^-$). Next, the iron(III) ion is reduced to iron(II) ion, and a hydroperoxide radical and a proton are produced due to the oxygen-based oxidizing agent ($Fe^{3+}+H_2O_2 \rightarrow Fe^{2+}+OH+H^+$). The standard electrode potential of the redox reaction can be measured as a potential different from the reference electrode by means of a cyclic voltammetry, etc. For example, the standard electrode potential of each of the following reactions has a numerical value shown below.

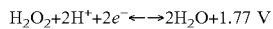

$H_2O_2+2H^++2e^- \leftarrow \rightarrow 2H_2O+1.77$ V

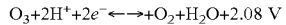

$O_3+2H^++2e^- \leftarrow \rightarrow +O_2+H_2O+2.08$ V

The oxygen-based oxidizing agent includes a metal peroxide such as hydrogen peroxide, ozone, percarbonate, persulfate and sodium peroxide, and an organic peroxide such as peracetic acid. The aqueous Fenton's reagent solution is preferably an aqueous solution containing 0.005 wt % or more of iron(II) ion and 0.5 wt % or more of an oxygen-based oxidizing agent and having a pH of 7 or less, more preferably an aqueous solution containing 0.005 wt % or more of iron(II) in and 1.0 wt % or more of an oxygen-based oxidizing agent and having a pH of 4 or less, and the pH is preferably adjusted with an weak acid such as organic acid. For example, when the to-be-treated liquid is seawater, a high cleaning effect can be obtained by using the aqueous Fenton's reagent solution above.

The to-be-treated liquid in the filtration step of the filtration method of the present embodiment is not particularly limited and includes not only seawater but also suspended water, step process liquid, etc. For example, the filtration method of the present embodiment can be used in a water clarification method including a step of filtering suspended water.

In the present description, the term "suspended water" indicates natural water, domestic drainage (wastewater), treated water thereof, etc. Examples of natural water include river water, lake and marsh water, underground water, and seawater. Treated water obtained by subjecting such natural water to a treatment such as sedimentation treatment, sand filtration treatment, coagulation sedimentation and sand filtration treatment, ozone treatment and activated carbon treatment, is also encompassed by the suspended water. An example of domestic drainage is sewage water. A primary treated water of sewage water, obtained by applying screening filtration or sedimentation treatment to sewage water, a secondary treated water of sewage water, obtained by applying biological treatment, and furthermore, a tertiary treated (highly treated) water obtained by applying a treatment such as coagulation sedimentation and sand filtration treatment, activated carbon treatment and ozone treatment, are also encompassed by the suspended water. Such suspended water may contain a suspended substance (e.g., humus colloid, organic colloid, clay, bacteria) composed of fine organic matter, inorganic matter or an organic-inorganic mixture, each being not larger than μm order, or a high-molecular substance derived from bacteria algae.

The water quality of suspended water can be generally specified by turbidity and/or organic matter concentration, which are typical indices of water quality. According to the turbidity (not an instantaneous turbidity but an average turbidity), the water quality can be roughly classified into, for example, low turbid water with a turbidity of less than 1, moderately turbid water with a turbidity of 1 or more and less than 10, highly turbid water with a turbidity of 10 or more and less than 50, and ultra-highly turbid water with a turbidity of 50 or more. In addition, according to the organic matter concentration (Total Organic Carbon (TOC): mg/L) (also not an instantaneous value but an average value), the water quality can be roughly classified into, for example, low TOC water of less than 1, medium TOC water of 1 or more and less than 4, high TOC water of 4 or more and less than 8, and ultra-high TOC water of 8 or more. Basically, water with higher turbidity or TOC is more likely to clog the porous filtration membrane and therefore, as the turbidity or TOC of water is higher, the effect due to using the porous filtration membrane for filtration is increased.

The step process liquid indicates a to-be-separated liquid at the time of separation between a valuable material and a non-valuable material in the manufacturing of food, a medicinal product, a semiconductor, etc. In the food manufacturing, the filtration method of the present embodiment can be used, for example, when separating alcoholic beverages such as Japanese sake and wine from yeast. In the manufacturing of medicinal product, the filtration method of the present embodiment can be used, for example, in the sterile filtration at the time of purification of protein. In the semiconductor manufacturing, the filtration method of the present embodiment can be used, for example, for the separation of an abrasive and water from the grinding wastewater.

The structure, material (quality of material) and production method of the porous membrane used in the filtration method of the present embodiment are described in detail below.

<Porous Membrane>

The porous membrane used in the filtration method of the present embodiment is any of a porous membrane where on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 1 μm² or less is 70% or more relative to the total area of resin parts; a porous membrane where in each region above, the total of areas of resin parts having an area of 10 μm² or more is 15% or less relative to the total area of resin parts; and a porous membrane where in each region above, the total of areas of resin parts having an area of 1 μm² or less is 70% or more relative to the total area of resin parts and the total of areas of resin parts having an area of 10 μm² or more is 15% or less relative to the total area of resin parts. The preferable porous membrane is a membrane where in each region above, the total of areas of resin parts having an area of 1 μm² or less is 70% or more relative to the total area of resin parts, the total of areas of resin parts having an area of more than 1 μm² and less than 10 μm² is 15% or less relative to the total area of resin parts, and the total of areas of resin parts having an area of 10 μm² or more is 15% or less relative to the total area of resin parts.

FIG. 1 is one example of an SEM image of a cross-section of a porous membrane used in the filtration method of the present embodiment. Such an SEM image is an image resulting from binarization processing of an SEM image photograph obtained by photographing a predetermined visual field within a region closest to the inner side among, on an SEM image of a membrane cross-section in the membrane thickness direction perpendicular to an inner surface of the hollow fiber porous membrane, the regions of a total of 4 visual fields with a visual field including the inner surface, a visual field including an outer surface of the membrane, and two visual fields photographed at regular intervals between those visual fields.

Incidentally, within each of the regions above, a difference in the existence distribution of resin parts, that is, an anisotropy of pore continuity, between the membrane cross-section in the membrane thickness direction perpendicular to the inner surface of the hollow fiber porous membrane and the cross-section running in parallel to the inner surface can be virtually ignored.

In the present description, the term "resin part" is a dendric skeleton portion of a three-dimensional network structure composed of a resin, which forms a large number of pores in the porous membrane. The portion indicated by black in FIG. 1 is a resin part, and the white portion is a pore.

Inside the porous membrane, a continuous pore continuing from the inner side to the outer side of the membrane while being bent is formed, and when on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 1 $\mu m^2$ or less is 70% or more relative to the total area of resin parts, the pore continuity is high (i.e., the existence ratio of a continuous pore inside the membrane is high), leading to a high flux (amount of water permeated, water permeability) of the to-be-treated liquid and a high permeability retention after cleaning, as a result, the damage to the membrane after chemical cleaning indicated by the tensile elongation at break is reduced. However, if the ratio of the total of areas of resin parts having an area of 1 $\mu m^2$ or less to the total area of resin parts is too high, the dendric skeleton portion of a three-dimensional network structure composed of a resin, which forms a large number of pores in the porous membrane, becomes too thin. For this reason, while keeping the total of areas of resin parts having an area of 1 $\mu m^2$ or less to be 70% or more relative to the total area of resin parts, a resin part existing such that the total of areas of resin parts having an area of more than 1 $\mu m^2$ is from 2 to 30% relative to the total area of resin parts is preferred, a resin part existing such that the total of areas of resin parts having an area of 10 $\mu m^2$ or more is 15% or less relative to the total area of resin parts is more preferred, and a resin part existing such that the total of areas of resin parts having an area of more than 1 $\mu m^2$ and less than 10 $\mu m^2$ is 15% or less relative to the total area of resin parts and the total of areas of resin parts having an area of 10 $\mu m^2$ or more is from 2 to 15% relative to the total area of resin parts is still more preferred. When the resin part exists such that the total of areas of resin parts having an area of more than 1 $\mu m^2$ is from 2 to 30% relative to the total area of resin parts, the dendric skeleton portion of a three-dimensional network structure composed of a resin is not too thin, so that the strength and tensile elongation at break of the porous membrane can be appropriately maintained.

FIGS. 2 to 5 are histograms illustrating the ratio (%) of the total of areas of resin parts each having a predetermined area to the total area of resin parts, on an SEM image of a membrane cross-section in the membrane thickness direction perpendicular to an inner surface of the porous membranes used in Example 1, Example 2, Example 3, and Comparative Example 2, respectively, in each region (circled numbers 1 to 4) of a total of 4 visual fields with a visual field including the inner surface, a visual field including an outer surface of the membrane, and two visual fields photographed at regular intervals between those visual fields. In FIG. 1, a resin part appears as particulate. In FIGS. 2 to 5, the area of each of the particulate resin parts is measured, and with respect to each particulate resin part area, the ratio of the area to the total area of all resin parts in a predetermined size of visual field within each region is illustrated as a histogram. Circled number 1 in FIGS. 2 to 5 is the number of a region closest to the inner side among, on an SEM image of a membrane cross-section in the membrane thickness direction perpendicular to an inner surface of the porous membrane, the regions of a total of 4 visual fields with a visual field including the inner surface, a visual field including an outer surface of the membrane, and two visual fields photographed at regular intervals between those visual fields, and circles number 4 is the number of a region closest to the inner side. For example, Example 1 circled number 1 is a histogram at the time of photographing a predetermined size of visual field within a region on the innermost side of the porous hollow fiber membrane of Example 1. The method for measuring the area distribution of resin parts within each region of the porous hollow fiber membrane is described later.

The surface opening ratio of the porous membrane is preferably from 25 to 60%, more preferably from 25 to 50%, still more preferably from 25 to 45%. When the surface opening ration on the side coming into contact with the treatment target liquid is 25% or more, deterioration of the water permeation performance due to clogging or abrasion of membrane surface is reduced, so that the filtration stability can be increased. On the other hand, if the surface opening ratio is high and the pore size is too large, the required separation performance may not be exerted. For this reason, the average pore size of the porous membrane is preferably from 10 to 700 nm, more preferably from 20 to 600 nm. When the average pore size is from 30 to 400 nm, the separation performance is sufficient and the pore continuity can also be ensured.

The methods for measuring the surface opening ratio and the average pore size are described later.

The membrane thickness of the porous membrane is preferably from 80 to 1,000 μm, more preferably from 100 to 300 μm. If the membrane thickness is 80 μm or more, the strength of the membrane can be ensured, and on the other hand, when the membrane thickness is 1,000 μm or less, the pressure loss due to membrane resistance is reduced.

The shape of the porous hollow fiber membrane includes an annular single-layer membrane but may be a multilayer membrane with the pore size differing between a separation layer and a support layer supporting the separation layer. In addition, the membrane may have a deformed cross-sectional structure, for example, by having a protrusion on the inner and outer surfaces of the membrane.

(Material (Quality of Material) of Porous Membrane)

The resin constituting the porous membrane is preferably a thermoplastic resin, more preferably a fluororesin. The fluororesin includes a resin selected from the group consisting of a vinylidene fluoride resin (PVDF), a chlorotrifluoroethylene resin, a tetrafluoroethylene resin, an ethylene-tetrafluoroethylene copolymer (ETFE), an ethylene-monochlorotrifluoroethylene copolymer (ECTFE), a hexafluoropropylene resin, and a mixture of these resins.

The thermoplastic resin includes a polyolefin, a copolymer of olefin and halogenated olefin, a halogenated polyolefin, and a mixture thereof. The thermoplastic resin includes, for example, polyethylene, polypropylene, polyvinyl alcohol, an ethylene-vinyl alcohol copolymer, an ethylene-tetrafluoroethylene copolymer, a polyvinylidene fluoride (may contain hexafluoropropylene domains), and a mixture thereof. These resins are superior as a membrane material, because they are easy to handle due to being thermoplastic and have toughness. Among these, a vinylidene fluoride resin, a tetrafluoroethylene resin, a hexafluoropropylene resin or a mixture thereof, a homopolymer or copolymer of ethylene, tetrafluoroethylene or chlorotrifluoroethylene, and a mixture of a homopolymer and a copolymer are preferred because of excellent mechanical strength and chemical strength (resistance to chemicals) and good moldability. More specifically, the resin includes a fluororesin such as polyvinylidene fluoride, vinylidene fluoride-hexafluoropropylene copolymer, ethylene-tetrafluoroethylene copolymer and ethylene-chlorotrifluoroethylene copolymer.

The porous membrane may contain a component (e.g., impurity) other than the thermoplastic resin, in an amount of up to about 5 mass %. For example, a solvent used at the time of production of the porous membrane is contained. As described later, a first solvent (hereinafter, sometimes referred to as a nonsolvent), a second solvent (hereinafter, sometimes referred to as a good solvent or a poor solvent), which are used at the time of production of the porous membrane, or both thereof are contained. Such a solvent can be detected by pyrolysis GC-MS (gas chromatography mass spectrometry).

The first solvent may be at least one member selected from the group consisting of sebacic acid ester, citric acid ester, acetylcitric acid ester, adipic acid ester, trimellitic acid ester, oleic acid ester, palmitic acid ester, stearic acid ester, phosphoric acid ester, a fatty acid having a carbon number of 6 to 30, and an epoxidized vegetable oil.

The second solvent is different from the first solvent and may be at least one member selected from the group consisting of sebacic acid ester, citric acid ester, acetylcitric acid ester, adipic acid ester, trimellitic acid ester, oleic acid ester, palmitic acid ester, stearic acid ester, phosphoric acid ester, a fatty acid having a carbon number of 6 to 30, and an epoxidized vegetable oil. The fatty acid having a carbon number of 6 to 30 includes capric acid, lauric acid, oleic acid, etc. The epoxidized vegetable oil includes epoxy soybean oil, epoxidized linseed oil, etc.

The first solvent is preferably a nonsolvent not allowing a thermoplastic resin to be uniformly dissolved in the first solvent even when in a first mixed solution of the thermoplastic resin and the first solvent at a ratio of 20:80, the temperature of the first mixed solution is raised to the boiling point of the first solvent.

The second solvent is preferably a good solvent allowing a thermoplastic resin to be uniformly dissolved in the second solvent when in a second mixed solution of the thermoplastic resin and the second solvent at a ratio of 20:80, the temperature of the second mixed solution is any temperature of more than 25° C. and not more than the boiling point of the second solvent.

The second solvent is more preferably a poor solvent not allowing a thermoplastic resin to be uniformly dissolved in the second solvent when in a second mixed solution of the thermoplastic resin and the second solvent at a ratio of 20:80, the temperature of the second mixed solution is 25° C., but allowing the thermoplastic resin to be uniformly dissolved in the second solvent when the temperature of the second mixed solution is any temperature of more than 100° C. and not more than the boiling point of the second solvent.

In the filtration method of the present embodiment, a porous hollow fiber membrane using polyvinylidene fluoride (PVDF) as the thermoplastic resin and containing a first solvent (nonsolvent) may be used.

In this case, the first solvent may be a nonsolvent which is at least one member selected from the group consisting of sebacic acid ester, citric acid ester, acetylcitric acid ester, adipic acid ester, trimellitic acid ester, oleic acid ester, palmitic acid ester, stearic acid ester, phosphoric acid ester, a fatty acid having a carbon number of 6 to 30, and an epoxidized vegetable oil and which does not allow the polyvinylidene fluoride to be uniformly dissolved in the first solvent even when in a first mixed solution of polyvinylidene fluoride and the first solvent at a ratio of 20:80, the temperature of the first mixed solution is raised to the boiling point of the first solvent. The nonsolvent is preferably bis 2-ethylhexyl adipate (DOA).

The porous hollow fiber membrane above may contain a second solvent different from the first solvent. In this case, the second solvent is preferably a good solvent which is at least one member selected from the group consisting of sebacic acid ester, citric acid ester, acetylcitric acid ester, adipic acid ester, trimellitic acid ester, oleic acid ester, palmitic acid ester, stearic acid ester, phosphoric acid ester, a fatty acid having a carbon number of 6 to 30, and an epoxidized vegetable oil and which allows the polyvinylidene fluoride to be uniformly dissolved in the second solvent when in a second mixed solution of polyvinylidene fluoride and the second solvent at a ratio of 20:80, the temperature of the second mixed solution is any temperature of more than 25° C. and not more than the boiling point of the second solvent. The second solvent is more preferably a poor solvent not allowing the polyvinylidene fluoride to be uniformly dissolved in the second solvent when the temperature of the second mixed solution is 25° C., but allowing the polyvinylidene fluoride to be uniformly dissolved in the second solvent when the temperature of the second mixed solution is any temperature of more than 100° C. and not more than the boiling point of the second solvent. The poor solvent is preferably tributyl acetylcitrate (ATBC).

(Physical Properties of Porous Membrane)

The porous membrane is preferably a porous membrane in which the relationship between the tensile elongation at break $E0$ of the porous membrane before the cleaning step and the tensile elongation at break $E1$ of the porous membrane after the cleaning step is $E1/E0 \times 100 \geq 80\%$, and in addition, is preferably a porous membrane in which the relationship between the tensile elongation at break $E0$ of the porous membrane before the cleaning step and the tensile elongation at break $EX$ of the porous membrane after repeating the cleaning step X times (X is an integer of 2 to 100) is $EX/E0 \times 100 \geq 70\%$.

The initial value of the tensile elongation at break is preferably 60% or more, more preferably 80% or more, still more preferably 100% or more, yet still more preferably 120% or more. The method for measuring the tensile elongation at break is described later.

The resistance to a cleaning chemical solution (insusceptibility to damage to the membrane) can be indicated by the retention of tensile elongation at break between before and after immersion in the chemical solution (elongation retention after immersion in the chemical solution). For example, the tensile elongation at break after immersion for 10 days in an aqueous Fenton's reagent solution containing 0.01% of iron(II) ion and 1% of hydrogen peroxide and having a pH of 2.8 adjusted with malic acid (corresponding to the tensile elongation at break $E1$ of the porous hollow fiber membrane after the cleaning step) preferably retains 80% or more, more preferably 85% or more, still more preferably 90% or more, of the initial value (corresponding to the tensile elongation at break $E0$ before the cleaning step).

In addition, the relationship between the initial value E0 and the tensile elongation at break EX of the membrane after repeating the cleaning step such as chemical cleaning step X times (X is an integer of 2 to 100) is preferably EX/E0≥70%, more preferably EX/E0275%, still more preferably EX/E0≥80%.

In view of practical use, the compressive strength of the porous membrane is preferably 0.2 MPa or more, more preferably from 0.3 to 1.0 MPa, still more preferably from 0.4 to 1.0 MPa.

(Water Permeation Performance of Porous Membrane)

The porous membrane is preferably a porous membrane in which the relationship between the flux L0 of the porous membrane before the filtration step and the flux L1 of the porous membrane after the cleaning step is 105%≥L1/L0×100≥95%.

In addition, the porous membrane is preferably a porous membrane in which the relationship between the flux L0 of the porous membrane before the filtration step and the flux LX of the porous membrane after repeating the cleaning step X times (X is an integer of 2 to 100) is 110≥LX/L0×100≥90%.

<Production Method of Porous Membrane>

The production method of the porous hollow fiber membrane is described below. However, the production method of the porous hollow fiber membrane used in the filtration method of the present embodiment is not limited to the following production method.

The production method of the porous hollow fiber membrane used in the filtration method of the present embodiment may be a method including (a) a step of preparing a melt-kneaded product, (b) a step of feeding the melt-kneaded product to a spinning nozzle having a multiple structure, and extruding the melt-kneaded product through the spinning nozzle, thereby obtaining a hollow fiber membrane, and (c) a step of extracting the plasticizer from the hollow fiber membrane. In the case where the melt-kneaded product contains an additive, the method may further include, after the step (c), (d) a step of extracting the additive from the hollow fiber membrane.

The concentration of the thermoplastic resin in the melt-kneaded product is preferably from 20 to 60 mass %, more preferably from 25 to 45 mass %, still more preferably from 30 to 45 mass %. When this value is 20 mass % or more, mechanical strength can increased and, on the other hand, when this value is 60 mass % or less, the water permeation performance can be increased. The melt-kneaded product may contain an additive.

The melt-kneaded product may be composed of two components of a thermoplastic resin and a solvent, or may be composed of three components of a thermoplastic resin, an additive, and a solvent. The solvent contains at least a nonsolvent as described later.

As the extractant used in the step (c), a liquid being incapable of dissolving the thermoplastic resin but having high affinity for the plasticizer, such as methylene or various alcohols, is preferably used.

In the case of using a melt-kneaded product containing no additive, a hollow fiber membrane obtained through the step (c) may be used as the porous hollow fiber membrane. In the case of producing the porous hollow fiber membrane by using a melt-kneaded product containing an additive, it is preferable to further pass through, after the step (c), (d) a step of extracting and removing the additive from the hollow fiber membrane to obtain a porous hollow fiber membrane. For the extractant in the step (d), a liquid capable of dissolving the melt or additive used, such as acid or alkali, but incapable of dissolving the thermoplastic resin is preferably used.

An inorganic matter may be used as the additive. The inorganic matter is preferably an inorganic fine powder. The primary particle diameter of the inorganic fine powder contained in the melt-kneaded product is preferably 50 nm or less, more preferably 5 nm or more and less than 30 nm. Specific examples of the inorganic fine powder include silica (including finely divided silica), titanium oxide, lithium chloride, calcium chloride, and organic clay, and among these, finely divided silica is preferred in view of cost. The "primary particle diameter of the inorganic fine powder" above means a value determined from the analysis of an electron photomicrograph. More specifically, first, a group of the inorganic fine powder is pretreated by the method of ASTM D3849. Thereafter, the diameters of 3,000 to 5,000 particles in a photograph taken with a transmission electron microscope are measured, and these values are arithmetically averaged to calculate the primary particle diameter of the inorganic fine powder.

With respect to the inorganic fine powder inside the porous hollow fiber membrane, the existing elements are identified by fluorescent X-ray, etc., and the material (quality of material) of the existing inorganic fine powder can thereby be identified.

In the case of using an inorganic matter as the additive, when a hydrophilic polymer such as polyvinylpyrrolidone and polyethylene glycol is used, hydrophilicity can be imparted to the hollow fiber membrane. In addition, when an additive with high viscosity, such as glycerin and ethylene glycol, is used, the viscosity of the melt-kneaded product can be controlled.

Next, (a) the step of preparing a melt-kneaded product in the production method of the porous hollow fiber membrane of the present embodiment is described in detail.

In the production method of the porous hollow fiber membrane of the present embodiment, a nonsolvent for the thermoplastic resin is mixed with a good solvent or a poor solvent. The mixed solvent after mixing becomes a nonsolvent for the thermoplastic resin used. When a nonsolvent is thus used as a raw material of the membrane, a porous hollow fiber membrane having a three-dimensional network structure is likely to be obtained. The action mechanism thereof is not necessarily clear, but it is considered that when a solvent with a solubility more reduced by mixing a nonsolvent is used, the crystallization of the polymer is appropriately inhibited and a three-dimensional network structure tends to be obtained. For example, the nonsolvent and the poor solvent or good solvent are selected from the group consisting of various esters, etc., such as phthalic acid ester, sebacic acid ester, citric acid ester, acetylcitric acid ester, adipic acid ester, trimellitic acid ester, oleic acid ester, palmitic acid ester, stearic acid ester, phosphoric acid ester, a fatty acid having a carbon number of 6 to 30, and an epoxidized vegetable oil.

A solvent capable of dissolving a thermoplastic resin at normal temperature is referred to as a good solvent, a solvent incapable of dissolving a thermoplastic resin at normal temperature but capable of dissolving it at high temperatures is referred to as a poor solvent for the thermoplastic resin, a solvent incapable of dissolving a thermoplastic resin even at high temperatures is referred as a nonsolvent, and whether the solvent is a good solvent, a poor solvent or a nonsolvent can be judged as follows.

About 2 g of a thermoplastic resin and about 8 g of a solvent are put in a test tube and warmed by a block heater for test tube up to the boiling point of the solvent in steps of about 10° C. and after the contents in the test tube are mixed by means of a spatula, the solvent is judged as a good solvent or a poor solvent when the thermoplastic solvent is dissolved, and judged as a nonsolvent when the thermoplastic solvent is not dissolved. The solvent is judged as a good solvent when the thermoplastic resin is dissolved at a relatively low temperature of 100° C. or less, and judged as a poor solvent when unless the temperature is raised to a high temperature of 100° C. or more and not more than the boiling point, the thermoplastic resin is not dissolved.

For example, when polyvinylidene fluoride (PVDF) is used as the thermoplastic resin and tributyl acetylcitrate (ATBC), dibutyl sebacate or dibutyl adipate is used as the solvent, PVDF uniformly mixes with the solvent at about 200° C. and dissolves. On the other hand, when bis 2-ethylhexyl adipate (DOA), diisononyl adipate or bis 2-ethylhexyl sebacate is used as the solvent, even if the temperature is raised to 250° C., PVDF is not dissolved in the solvent.

In addition, when an ethylene-tetrafluoroethyl copolymer (ETFE) is used as the thermoplastic resin and diethyl adipate is used as the solvent, ETFE uniformly mixes and dissolves at about 200° C. On the other hand, when bis 2-ethylhexyl adipate (DIBA) is used, the resin is not dissolved.

Furthermore, when an ethylene-monochlorotrifluoroethylene copolymer (ECTFE) is used as the thermoplastic resin and triethyl citrate is used as the solvent, the resin uniformly dissolves at about 200° C., and when triphenyl phosphite (TPP) is used, the resin is not dissolved.

Another embodiment of the present embodiment is a method for operating a filtration system, including the following steps:

a permeate production step employing a filtration system including a microfiltration (MF) or ultrafiltration (UF) unit using a porous membrane and a reverse osmosis (RO) unit; and a regeneration step of the filtration system;

wherein the permeate production step includes the following steps:

a filtration step of passing a to-be-treated liquid containing a to-be-filtered material through a porous membrane composed of a resin having a three-dimensional network structure to separate a filtrate by MF or UF from the to-be-filtered material, in which on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 1 µm$^2$ or less is 70% or more relative to the total area of resin parts, and/or on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 10 µm$^2$ or more is 15% or less relative to the total area of resin parts; and a step of purifying the obtained filtrate by means of the RO unit:

the regeneration step of the filtration system includes the following steps:

a cleaning step of passing or soaking the porous membrane into a cleaning solution to clean the inside of the porous membrane, in which the cleaning solution is an oxygen-based oxidizing agent having a standard electrode potential of 1.8 V or more; and a rinsing step of rinsing the cleaning solution remaining inside the porous membrane by using 10 L of a rinse water per the membrane area of 1 m$^2$ of the porous membrane; and the concentration of the oxygen-based oxidizing agent in the filtrate at the time of resuming the filtration step after the rinsing step is 1 mg/L or less.

The porous membrane used in the filtration method of the present embodiment can be used as a microfiltration (MF) membrane or an ultrafiltration (UF) membrane.

For the RO unit, a known RO membrane can be used.

Figure 6:
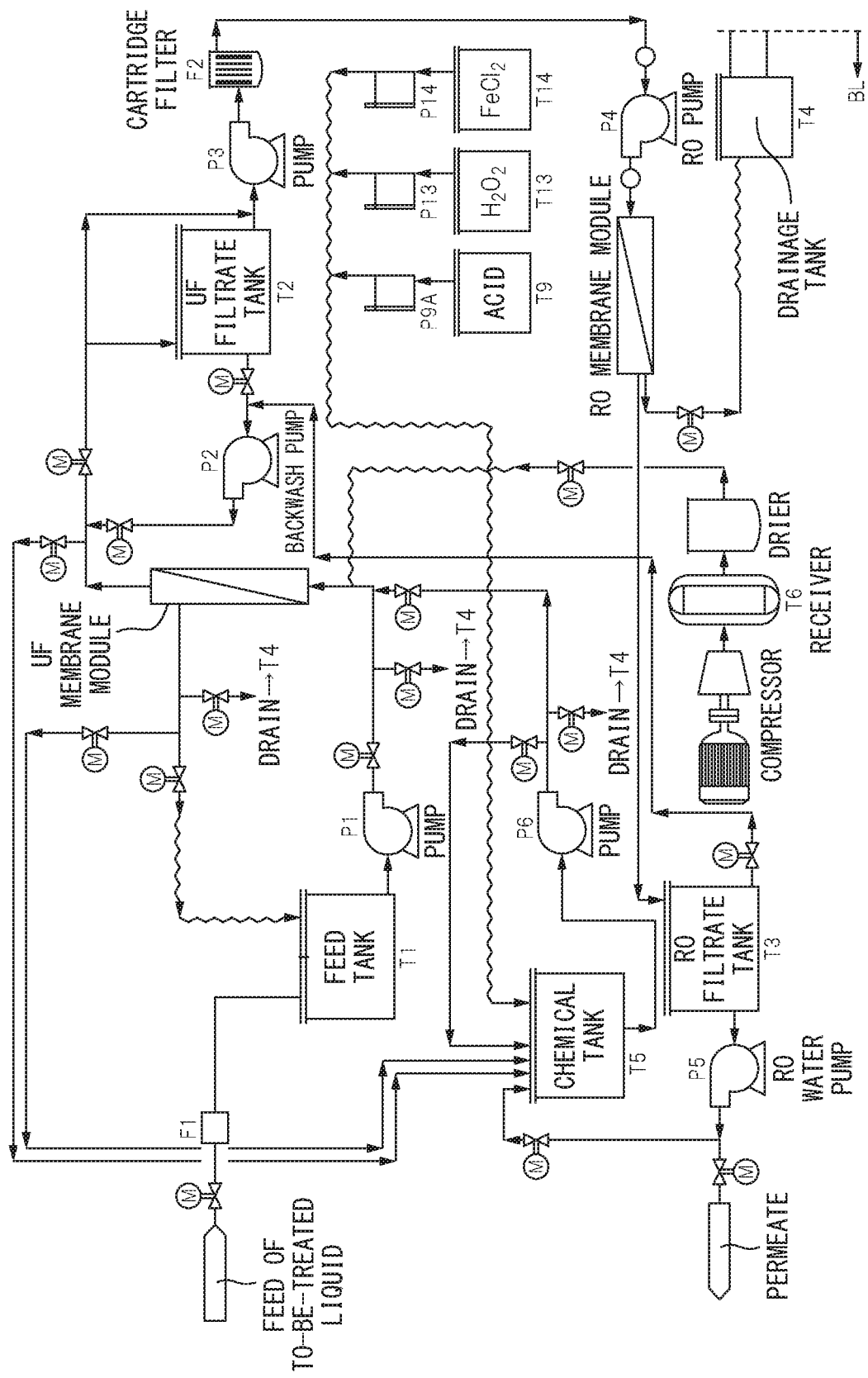
FIG. 6 is a flowchart of one example of the filtration system including an ultrafiltration (UF) unit using a porous membrane and a reverse osmosis (RO) unit.

FIG. 6 is a flowchart of one example of the filtration system including an ultrafiltration (UF) unit using a porous membrane and a reverse osmosis (RO) unit. First, the to-be-treated liquid, i.e., to-be-treated water, is separated by UF membrane into treated water (filtrate) and drainage. The filtrate is stored in a UF filtrate tank (T2), and the liquid containing suspension, etc. is transferred as a drainage to a drainage tank (T4). The UF filtrate is transferred to an RO membrane module via a cartridge filter, and while a part is stored in an RO filtrate tank (T3) and works out to a permeate, the residue is transferred to the drainage tank (T4).

As illustrated in FIG. 6, the cleaning solution in a chemical tank (T5) is injected into a UF membrane module by a pump (P6) and thereafter, the filtrate in the UF filtrate tank (T2) is transferred as a rinse solution by a backwash pump (P2) to rinse the UF membrane. Subsequently, the residual liquid is removed by compressed air.

EXAMPLES

The present invention is described specifically below by referring to Examples, but the present invention is not limited thereto. Each of physical property values in Examples and Comparative Examples was determined by the following method.

(1) Outside Diameter and Inside Diameter of Porous Hollow Fiber Membrane

The porous hollow fiber membrane was thinly sliced at a cross-section perpendicular to the length direction by mans of a razor, and the outside diameter and inside diameter were measured using a 100-fold magnifying glass. With respect to one sample, the measurement was performed on 60 cut planes at intervals of 30 mm in the length direction, and average values are defined as the outside diameter and inside diameter of the hollow fiber membrane.

(2) Electron Photomicroscopy

The porous hollow fiber membrane was annularly cut at a cross-section perpendicular to the length direction, and 10% phosphotungstic acid+osmium tetroxide staining was conducted, followed by embedding in an epoxy resin. Subsequently, after trimming. BIB processing was applied to the sample cross-section to provide a smooth cross-section, and the cross-section was subjected to a conductive treatment to prepare a sample for microscopic examination. With respect to the prepared sample for microscopic examination, using an electron microscope, SU8000 series, manufactured by HITACHI, Ltd., an electron microscope (SEM) image of a membrane cross-section was taken at a 5,000 to 30,000 times at an accelerating voltage of 1 kV within a predetermined visual field among respective regions (circles numbers 1 to 4 in FIGS. 2 to 5) of a total of 4 visual fields with a visual field including an inner surface of the thick membrane (thick wall part) cross-section, a visual field including an outer surface of the membrane and two visual fields photographed at regular intervals between those visual fields. The measurement can be performed by changing the magnification according to the average pore size, and specifically, the magnification was 5,000 times when the average pore size is 0.1 µm or more, 10,000 times when the average pore size is 0.05 µm or more and less than 0.1 µm, and 30,000 times when the average pore size is less than 0.05 µm. Incidentally, the size of the visual field was 2,560×1,920 pixels.

In the image processing, ImageJ was used, and Threshold processing (Image-Adjust-Threshold: Otsu method is selected) was applied to the photographed SEM image to binarized the image by the pore portion and the resin part.

Surface opening ratio: The surface opening ratio was measured by calculating the ratio between resin part and pore part of the binarized image.

Area distribution of resin parts: Using "Analyze Particle" command (Analyze Particle: Size 0.10-Infinity) of ImageJ, the size of each of the binarized particulate resin parts included in the photographed SEM image was measured. Denoting $\Sigma S$ as the total area of all resin parts included in the SEM image and $\Sigma S(<1 \, \mu m^2)$ as the area of resin parts of 1 $\mu m^2$ or less, $\Sigma S(<1 \, \mu m^2)/S$ was calculated, and the ratio of the area of resin parts having an area of 1 $\mu m^2$ or less was thereby calculated. The ratio of the area of resin parts having an area in a predetermined range was calculated in the same manner.

Incidentally, as to the noise removal at the time of applying binarization processing, resin parts having an area of less than 0.1 $\mu m^2$ were removed as a noise, and resin parts having an area of 0.1 $\mu m^2$ or more were used as the analysis target. In addition, the noise removal was performed by applying median filter processing (Process-Filters-Median; Radius: 3.0 pixels).

Particulate resin parts discontinued at an edge of the SEM image were also used as the measurement target. Furthermore, processing of "Include Holes" (filling holes) was not performed. In addition, a processing of correcting the shape, for example, from "snowman" form to "flat" form, etc. was not performed.

Average pore size: The average pore size was measured using "Plugins-Bone J-Thickness" command of ImageJ. Incidentally, the space size is defined as a maximum circle size over which the circle cannot fit in the void.

(3) Flux (Water Permeability, Initial Pure Water Flux)

The porous hollow fiber membrane was immersed in ethanol and then repeatedly immersed in pure water several times. The wet hollow fiber membrane having a length of about 10 cm was sealed in at one end, and an injection needle was inserted into a hollow part at the other end. Pure water at 25° C. was injected under a pressure of 0.1 MPa from the injection needle in an environment at 25° C., and the amount of pure water permeated from the outer surface of the membrane was measured. The water permeability was evaluated by determining a pure water flux according to the following formula:

Initial pure water flux[L/m$^2$/h]=60×(amount of permeate[L])/{π×(outside diameter of membrane [m])×(effective length of membrane[m])×(measurement time[min])}

Here, the "effective length of membrane" indicates a net membrane length excluding a portion into which the injection needle is inserted.

(4) Retention of Water Permeation Performance at Time of Suspended Water (Seawater) Filtration The retention of water permeation performance at the time of suspended water (seawater) filtration is one index for judging the degree of deterioration of water permeation performance due to clogging (fouling). Using a wet hollow fiber membrane after being immersed in ethanol and then repeatedly immersed in pure water several times, filtration was performed with an effective membrane length of 11 cm by an external pressure system. First, pure water was filtered at a filtration pressure that allows permeation of 10 m$^3$ per day per 1 m$^2$ of the outer surface area of membrane, and permeate was collected for 2 minutes and taken as initial pure water permeability. Subsequently, suspended water (natural seawater collected from Tokyo Bay, Port of Kawasaki; turbidity: 2.2, TOC concentration: 2.4 ppm) was filtered for 10 minutes at the same filtration pressure as that when measuring the initial pure water flux, and permeate was collected for 2 minutes from 8 minutes to 10 minutes of filtration and taken as permeability at the time of suspended water filtration. The retention of water permeation performance at the time of suspended water filtration was determined according to the following formula.

Retention of water permeation performance at the time of suspended water filtration[%]=100× (permeability at the time of suspended water filtration[g])/(initial pure water permeability[g])

Incidentally, each parameter was calculated according to the following formula.

Filtration pressure={(inlet pressure)+(outlet pressure)}/2

Outer surface area of membrane[m$^2$]=π×(outside diameter of hollow fiber membrane[m])×(effective length of hollow fiber membrane[m])

Membrane surface linear velocity[m/s]=4×(amount of circulating water[m$^3$/s])/{π×(tube diameter [m])$^2$−π×(outside diameter of membrane[m])$^2$}

The operations were all performed at 25° C. and a membrane surface linear velocity of 0.5 m/sec.

In this measurement, the filtration pressure of suspended water was not the same among membranes but was set to a filtration pressure at the Flux when initial pure water permeation performance (that is also water permeation performance at the start of suspended water filtration) allows permeation of 10 m$^3$ per day per 1 m$^2$ of the outer surface area of membrane. More specifically, for example, when the Flux is set to 1 m/d=41.7 LMH, the pressure with the membrane of Example 1 is about 10 kPa, and while filtering suspended water by using it as the initial pressure, how the Flux decreases over the time was observed. Accordingly, the initial pressure in the case of using the membranes of Examples 2 and 3 is slightly different from the initial pressure in the case of using the membrane of Example 1. This is because, in the actual tap water treatment and sewage treatment, a membrane is usually used in a fixed amount filtering operation (a system of operating filtration by adjusting the filtration pressure so as to obtain a fixed amount of filtered water within a fixed time) and thus, also in this measurement, it was made possible for deterioration in water permeation performance to be compared in the conditions as close to the conditions of the fixed amount filtering operation as possible within the range of measurement using one hollow fiber membrane.

(5) Tensile Elongation at Break (%)

The porous hollow fiber membrane was directly used as the sample, and the tensile elongation at break was calculated in conformity with JIS K7161. The load and displacement at the time of tensile fracture were measured under the following conditions.

Measurement device: Instron tensile tester (AGS-5D, manufactured by Shimadzu Corporation)
Chuck-to-chuck distance: 5 cm
Tensile speed: 20 cm/min (6) Cleaning Chemical Solution Resistance Test At the measurement of Water Permeability At Time of Suspended Water Filtration described in (4) above, i.e., after the suspended water filtration, the porous hollow fiber membrane was cut into 10 cm, and 20 membranes were immersed in four kinds of cleaning chemical solutions each in an amount of 500 ml and held at 40° C. for 8 hours. (A) A chemical solution containing 0.01% of iron(II) ion and 1% hydrogen peroxide and having a pH of 2.8 adjusted with malic acid, (B) a chemical solution containing 0.01% of iron(II) ion and 1% sodium percarbonate and having a pH of 2.8 adjusted with malic acid, (C) a chemical solution containing 0.01% of iron(II) ion and 10 mg/L of ozone and having a pH of 2.8 adjusted with malic acid, and (D) a chemical solution containing 0.01% of iron(II) ion and 1% sodium persulfate and having a pH of 2.8 adjusted with malic acid were prepared. In all chemical solutions, a hydroxy radical is generated and the standard electrode potential is around 2.38 V.

The tensile elongation at break of the membrane before and after immersion in the chemical solution was measured for n=20, and an average value thereof was calculated. The "elongation retention after immersion in chemical solution (%)" was defined by 100×(tensile elongation at break E1 after immersion)/(tensile elongation at break E0 before immersion), and the resistance to an aqueous Fenton's reagent solution was evaluated. Incidentally, the tensile elongation at break before immersion in chemical solution corresponds to the tensile elongation at break before the cleaning step, and the tensile elongation at break after immersion corresponds to the tensile elongation at break after cleaning step.

Furthermore, after the above-described suspended water filtration, a cleaning step by immersion in the chemical solution above was repeated 10 times. Denoting E0 as the initial value of the tensile elongation at break (tensile elongation at break before immersion) and E10 as the value of tensile elongation at break of the porous hollow fiber membrane after repeating the cleaning step 10 times, E10/E0 was calculated as the "retention (%) of the tensile elongation at break after repeating 10 chemical cleaning cycles", and the chemical resistance was evaluated.

Before measuring the tensile elongation, all cleaning sample fibers were measured for the flux (3). Denoting L0 (flux L0) as the initial pure water permeability and L1 (flux L1) as the water permeability after the cleaning step of measuring E1, L1/L0 was calculated as the "retention (%) of the water permeability after immersion in chemical solution".

Denoting L0 (flux L0) as the initial pure water permeability and L10 (flux L10) as the water permeability of the fiber measured for E10, L10/L0 was calculated as the "water permeability retention (%) after repeating 10 chemical cleaning cycles".

(7) Oxygen-Based Oxidizing Agent Concentration in Filtrate

For the measurement of the oxidizing agent concentration in the filtrate, a general-purpose method may be appropriately used. For example, peroxide concentration measurement test paper (produced by MQuant, Merck) or in the case where the oxidizing agent is ozone, an ozone concentration meter (OZ-21P, manufactured by DKK-TOA Corporation), etc. can be utilized. Furthermore, when the correlation between the redox potential and the concentration of the oxidizing agent used is grasped using an oxidation-reduction potentiometer (HM-42X, manufactured by DKK-TOA Corporation), the oxidizing agent concentration can be determined from the oxidation-reduction potential.

Example 1

A melt-kneaded product was prepared using 40 mass % of PVDF resin (KF-W #1000, produced by Kureha Corporation) as a thermoplastic resin, 23 mass % of finely divided silica (primary particle diameter: 16 nm), 32.9 mass % of bis 2-ethylhexyl adipate (DOA) as a nonsolvent, and 4.1 mass % of tributyl acetylcitrate (ATBC, boiling point: 343° C.) as a poor solvent. The temperature of the obtained melt-kneaded product was 240° C. The obtained melt-kneaded product was extruded using a spinning nozzle having a double tube structure to pass a hollow-fiber extrudate through a free running distance of 120 mm and then solidified in water at 30° C., and a porous structure was developed by a thermally induced phase separation method. The obtained hollow-fiber extrudate was taken out at a rate of 5 m/min and wound on a skein. The wound hollow fiber extrudate was immersed in isopropyl alcohol to extract and remove DOA and ATBC, then immersed in water for 30 minutes to water-displace the hollow fiber membrane, and subsequently immersed in an aqueous 20 mass % NaOH solution at 70° C. for 1 hour. Furthermore, water washing was repeated, and finely divided silica was thereby was extracted and removed to produce a porous hollow fiber membrane. The obtained hollow fiber membrane had an inside diameter of 0.7 mm and an outside diameter of 1.2 mm.

6,600 hollow fiber membranes cut into 2.2 m and each of which has a blocked hollow part on one end were bundled and inserted into a housing having an inside diameter of 154 mm.

Subsequently, into the end part of the hollow fiber membrane bundle on the side having blocked hollow parts, 8 cylindrical regulating members having an outside diameter of 11 mm (a member previously formed by casting the same adhesive as the following potting material in a mold and curing it) were inserted and arranged to be evenly distributed. On the other hand, in order to form a through hole, a columnar member made of polypropylene and has a good mold releasability was inserted into the end part of the hollow fiber membrane bundle.

Thereafter, a bonding/fixing part-forming vessel attached with a tube for introduction of a potting material was fixed to both ends of the housing 5 and while rotating it in the horizontal direction, a potting material was injected into the first tubular member and second tubular member of the housing. As the potting material, a two-pack thermosetting urethane resin (SA-6330A2/SA-6330B5 (trade name), produced by SANYU REC, LTD.) was used. When a curing reaction of the potting material proceeded and fluidization was stopped, the rotation of the centrifuge was stopped, and the housing was taken out, followed by heating and curing at 50° C. in an oven.

After that, the end part of the hollow fiber membrane bundle on the side having blocked hollow parts of the housing was cut to open the hollow parts on the side where the hollow part was blocked in a stage before bonding. A columnar member was removed from a bonding/fixing part on the other tubular member side to form a plurality of through holes. In this way, an one-side open, outside-pressure type hollow fiber membrane module having a membrane effective length: 2 m and an effective membrane area: 50 $m^2$ was manufactured.

The formulation, production conditions and various physical properties of the obtained porous membrane are shown in Table 1 below. The obtained porous hollow fiber membrane had a three-dimensional network structure and was a membrane with high continuity having a high flux (water permeability) and a water permeability retention during filtration of 75%. The retention E1/E0 of the tensile elongation at break after immersion in chemical solution, the retention E10/E0 of the tensile elongation at break after repeating 10 chemical cleaning cycles, the retention L1/L0 of the water permeability after immersion in chemical solution, and the retention L10/L0 of the water permeability after repeating 10 chemical cleaning cycles, when cleaning chemical solutions (A) to (D) were used, are shown in Table 1 below. The obtained membrane could maintain the water permeability, and an increase in the pore size of the membrane due to deterioration by the chemical solution was not observed.

In addition, an experiment of filtering actual seawater by an apparatus illustrated in FIG. 6 using the obtained hollow fiber membrane module was performed. In the filtration step, a filtration operation for 30 minutes was performed using a filtration pump P1, and subsequent air bubbling cleaning for 1.5 minutes with compressed air produced by a compressor and backwashing with a filtered water using the backwash pump P2 were taken as one cycle. Thereafter, the cleaning chemical solution (A) was prepared in the chemical tank T5 by using each pair of an acid tank T9 and a pump P9A, an $H_2O_2$ tank T13 and a pump P13, and an $FeCl_2$ tank T14 and a pump P14. Furthermore, as the cleaning step, an UF membrane module-housing was filled with the cleaning chemical solution (A) and left standing still for 30 minutes. After that, the used chemical solution was discharged to the drainage tank T4 vis a drain port. As the rinsing step, 500 l of filtered seawater was backwashed from the UF filtrate tank T2 by using the backwash pump P2, and water after backwashing was directly discharged to T4. The residual liquid in the module was discharged from the bottom via a drain port. Subsequently, the filtration step was resumed, and the peroxide in the filtrate was measured by peroxide concentration measurement test paper (produced by MQuant, Merck). As a result, it was confirmed that the concentration of the cleaning chemical solution (A) is 1 mg/L or less.

Seawater desalination was performed by feeding UF filtered water in the UF filtrate tank T2 to an RO membrane module (SW30-4040, manufactured by DOW) via a booster pump P3 and an RO high-pressure pump P4, and the RO filtered water was stored in the RO filtrate tank T3.

The cleaning step was conducted once per month, and water (RO filtered water) with a salt rejection rate of 99.4% could be obtained throughout the year.

Example 2

A melt-kneaded product was prepared using 40 mass % of ETFE resin (TL-081, produced by AGC Inc.) as a thermoplastic resin, 23 mass % of finely divided silica (primary particle diameter: 16 nm), 32.9 mass % of bis 2-ethylhexyl adipate (DOA) as a nonsolvent, and 4.1 mass % of diisobutyl adipate (DIBA) as a poor solvent. The temperature of the obtained melt-kneaded product was 240° C. The obtained melt-kneaded product was extruded using a spinning nozzle having a double tube structure to pass a hollow-fiber extrudate through a free running distance of 120 mm and then solidified in water at 30° C., and a porous structure was developed by a thermally induced phase separation method. The obtained hollow-fiber extrudate was taken out at a rate of 5 m/min and wound on a skein. The wound hollow fiber extrudate was immersed in isopropyl alcohol to extract and remove DOA and DIBA, then immersed in water for 30 minutes to water-displace the hollow fiber membrane, and subsequently immersed in an aqueous 20 mass % NaOH solution at 70° C. for 1 hour. Furthermore, water washing was repeated, and finely divided silica was thereby was extracted and removed to produce a porous hollow fiber membrane. The obtained hollow fiber membrane had an inside diameter of 0.7 mm and an outside diameter of 1.2 mm. A hollow fiber membrane module was manufactured in the same manner as in Example 1.

The formulation, production conditions and various physical properties of the obtained porous membrane are shown in Table 1 below. The obtained porous hollow fiber membrane had a three-dimensional network structure and was a membrane with high continuity having a high flux (water permeability) and a water permeability retention during filtration of 70%. The retention E1/E0 of the tensile elongation at break after immersion in chemical solution, the retention E10/E0 of the tensile elongation at break after repeating 10 chemical cleaning cycles, the retention L1/L0 of the water permeability after immersion in chemical solution, and the retention L10/L0 of the water permeability after repeating 10 chemical cleaning cycles, when cleaning chemical solutions (A) to (D) were used, are shown in Table 1 below. The obtained membrane could maintain the water permeability, and an increase in the pore size of the membrane due to deterioration by the chemical solution was not observed.

A seawater filtration test using the hollow fiber membrane module was performed in the same manner as in Example 1, as a result, it was confirmed that the concentration of the cleaning chemical solution (A) in water in the filtration step after the cleaning step and rinsing step is 1 mg/L or less, and water (RO filtered water) with a salt rejection rate of 99.4% could be obtained throughout the year.

Example 3

A melt-kneaded product was prepared using 40 mass % of ECTFE resin (Halar 901, produced by Solvay Specialty Polymers Co.) as a thermoplastic resin, 23 mass % of finely divided silica (primary particle diameter: 16 nm), 32.9 mass % of triphenyl phosphite (TPP) as a nonsolvent, and 4.1 mass % of bis 2-ethylhexyl adipate (DOA) as a poor solvent. The temperature of the obtained melt-kneaded product was 240° C. The obtained melt-kneaded product was extruded using a spinning nozzle having a double tube structure to pass a hollow-fiber extrudate through a free running distance of 120 mm and then solidified in water at 30° C., and a porous structure was developed by a thermally induced phase separation method. The obtained hollow-fiber extrudate was taken out at a rate of 5 m/min and wound on a skein. The wound hollow fiber extrudate was immersed in isopropyl alcohol to extract and remove TPP and DOA, then immersed in water for 30 minutes to water-displace the hollow fiber membrane, and subsequently immersed in an aqueous 20 mass % NaOH solution at 70° C. for 1 hour. Furthermore, water washing was repeated, and finely divided silica was thereby was extracted and removed to produce a porous hollow fiber membrane. The obtained hollow fiber membrane had an inside diameter of 0.7 mm and an outside diameter of 1.2 mm.

The formulation, production conditions and various physical properties of the obtained porous membrane are shown in Table 1 below. The obtained porous hollow fiber membrane had a three-dimensional network structure and was a membrane with high continuity having a high flux (water permeability) and a water permeability retention during filtration of 80%. The retention E1/E0 of the tensile elongation at break after immersion in chemical solution, the retention E10/E0 of the tensile elongation at break after repeating 10 chemical cleaning cycles, the retention L1/L0 of the water permeability after immersion in chemical solution, and the retention L10/L0 of the water permeability after repeating 10 chemical cleaning cycles, when cleaning chemical solutions (A) to (D) were used, are shown in Table 1 below. The obtained membrane could maintain the water permeability, and an increase in the pore size of the membrane due to deterioration by the chemical solution was not observed.

A seawater filtration test using the hollow fiber membrane module was performed in the same manner as in Example 1, as a result, it was confirmed that the concentration of the cleaning chemical solution (A) in water in the filtration step after the cleaning step and rinsing step is 1 mg/L or less, and water (RO filtered water) with a salt rejection rate of 99.4% could be obtained throughout the year.

Comparative Example 1

The hollow fiber membrane of Comparative Example 1 was obtained by producing the membrane in the same manner as in Example 1 except that the solvent was only ATBC. The formulation, production conditions and various physical properties of the obtained porous membrane are shown in Table 1 below. The obtained porous hollow fiber membrane had a spherulite structure and was a membrane with low continuity having a low flux. The retention E1/E0 of the tensile elongation at break after immersion in chemical solution, the retention E1/E0 of the tensile elongation at break after repeating 10 chemical cleaning cycles, the retention L1/L0 of the water permeability after immersion in chemical solution, and the retention L10/L0 of the water permeability after repeating 10 chemical cleaning cycles, when cleaning chemical solutions (A) to (D) were used, are shown in Table 1 below.

A seawater filtration test using the hollow fiber membrane module was performed in the same manner as in Example 1, as a result, the concentration of the cleaning chemical solution (A) in water in the filtration step after the cleaning step and rinsing step was about 2 mg/L, and the salt rejection rate of the RO filtered water was reduced to 95% after a year.

Comparative Example 2

The hollow fiber membrane of Comparative Example 2 was obtained by producing the membrane in the same manner as in Example 1 except that the content of the finely divided silica was changed to 0% and the solvent was only γ-butyrolactone. The formulation, production conditions and various physical properties of the obtained porous membrane are shown in Table 1 below. The obtained porous hollow fiber membrane had a spherulite structure and was a membrane with low continuity having a low flux. The retention E1/E0 of the tensile elongation at break after immersion in chemical solution, the retention E10/E0 of the tensile elongation at break after repeating 10 chemical cleaning cycles, the retention L1/L0 of the water permeability after immersion in chemical solution, and the retention L10/L0 of the water permeability after repeating 10 chemical cleaning cycles, when cleaning chemical solutions (A) to (D) were used, are shown in Table 1 below.

A seawater filtration test using the hollow fiber membrane module was performed in the same manner as in Example 1, as a result, the concentration of the cleaning chemical solution (A) in water in the filtration step after the cleaning step and rinsing step was about 3 mg/L, and the salt rejection rate of the RO filtered water was reduced to 93% after a year.

Comparative Example 3

The hollow fiber membrane of Comparative Example 3 was obtained by producing the membrane in the same manner as in Example 3 except that the solvent was only DOA. The formulation, production conditions and various physical properties of the obtained porous membrane are shown in Table 1 below. The obtained porous hollow fiber membrane had a spherulite structure and was a membrane with low continuity having a low flux. The retention E1/E0 of the tensile elongation at break after immersion in chemical solution, the retention E10/E0 of the tensile elongation at break after repeating 10 chemical cleaning cycles, the retention L1/L0 of the water permeability after immersion in chemical solution, and the retention L10/L0 of the water permeability after repeating 10 chemical cleaning cycles, when cleaning chemical solutions (A) to (D) were used, are shown in Table 1 below.

A seawater filtration test using the hollow fiber membrane module was performed in the same manner as in Example 1, as a result, the concentration of the cleaning chemical solution (A) in water in the filtration step after the cleaning step and rinsing step was about 2 mg/L, and the salt rejection rate of the RO filtered water was reduced to 95% after a year.

TABLE 1

|  | Example 1 | Example 2 | Example 3 | Comparative Example 1 |
|---|---|---|---|---|
| Resin | PVDF KF W#1000 40% | ETFE TL-081 40% | ECTFE Halar 901 40% | PVDF KF W#1000 40% |
| Additive | finely divided silica 23% | finely divided silica 23% | finely divided silica 23% | finely divided silica 23% |
| Nonsolvent | DOA: 32.9% | DOA: 32.9% | TPP: 32.9% | none |
| Poor solvent | ATBC: 4.1% | DIBA: 4.1% | DOA: 4.1% | ATBC: 37% |
| Discharge temperature of membrane-forming stock solution [° C.] | 240 | 240 | 240 | 240 |

TABLE 1-continued

| | | | | |
|---|---|---|---|---|
| Coagulating liquid | water | water | water | water |
| Coagulating liquid temperature [° C.] | 30 | 30 | 30 | 30 |
| Free running distance [mm] | 120 | 120 | 120 | 120 |
| Pore size [nm] | 500 | 600 | 400 | 200 |
| Pore structure | 3D network | 3D network | 3D network | spherulite structure |
| Surface opening ratio [%] | 30 | 30 | 30 | 20 |
| Water permeability [L/(m2 · h)] | 4,000 | 5,000 | 3,500 | 150 |
| Outside diameter/inside diameter [mm] | 1.2/0.7 | 1.2/0.7 | 1.2/0.7 | 1.2/0.7 |
| Tensile elongation at break [%] | 170 | 160 | 180 | 30 |
| (A) Elongation retention after immersion in chemical solution [%] | 95 | 100 | 100 | 80 |
| (A) Water permeability retention after immersion in chemical solution [%] | 100 | 100 | 100 | 110 |
| (A) Elongation retention after repeating 10 chemical cleaning cycles | 70 | 90 | 95 | 20 |
| (A) Water permeability retention after repeating 10 chemical cleaning cycles | 95 | 95 | 95 | 200 |
| (B) Elongation retention after immersion in chemical solution [%] | 95 | 95 | 90 | 70 |
| (B) Water permeability retention after immersion in chemical solution [%] | 95 | 95 | 95 | 110 |
| (B) Elongation retention after repeating 10 chemical cleaning cycles | 80 | 90 | 90 | 30 |
| (B) Water permeability retention after repeating 10 chemical cleaning cycles | 100 | 100 | 100 | 160 |
| (C) Elongation retention after immersion in chemical solution [%] | 90 | 100 | 100 | 75 |
| (C) Water permeability retention after immersion in chemical solution [%] | 100 | 100 | 100 | 110 |
| (C) Elongation retention after repeating 10 chemical cleaning cycles | 80 | 80 | 85 | 40 |
| (C) Water permeability retention after repeating 10 chemical cleaning cycles | 100 | 100 | 100 | 150 |
| (D) Elongation retention after immersion in chemical solution [%] | 90 | 95 | 100 | 70 |
| (D) Water permeability retention after immersion in chemical solution [%] | 100 | 100 | 100 | 100 |
| (D) Elongation retention after repeating 10 chemical cleaning cycles | 80 | 90 | 90 | 35 |
| (D) Water permeability retention after repeating 10 chemical cleaning cycles | 100 | 100 | 100 | 160 |
| Ratio of resin parts of 1 um2 or less by image analysis (1) | 82 | 84 | 94 | 18 |
| Ratio of resin parts of 1 um2 or less by image analysis (2) | 78 | 76 | 98 | 17 |
| Ratio of resin parts of 1 um2 or less by image analysis (3) | 77 | 75 | 98 | 15 |
| Ratio of resin parts of 1 um2 or less by image analysis (4) | 73 | 76 | 97 | 14 |
| Ratio of resin parts of 10 um2 or more by image analysis (1) | 7 | 7 | 3 | 63 |
| Ratio of resin parts of 10 um2 or more by image analysis (2) | 8 | 15 | 0 | 68 |
| Ratio of resin parts of 10 um2 or more by image analysis (3) | 13 | 2 | 0 | 55 |
| Ratio of resin parts of 10 um2 or more by image analysis (4) | 7 | 13 | 0 | 75 |
| Retention of water permeation performance [%] | 75 | 70 | 80 | 30 |
| Filtration test using hollow fiber membrane module (A) Oxidizing agent concentration in filtered water in the filtration step after chemical cleaning step-rinsing step [mg/L] | >1.0 | >1.0 | >1.0 | 2.0 |

| | Comparative Example 2 | Comparative Example 3 |
|---|---|---|
| Resin | PVDF KF W#1000 40% | ECTFE Halar 901 40% |
| Additive | none | finely divided silica 23% |
| Nonsolvent | none | none |
| Poor solvent | γ-butyrolactone: 60% | DOA: 4.1% |
| Discharge temperature of membrane-forming stock solution [° C.] | 200 | 240 |
| Coagulating liquid | water | water |
| Coagulating liquid temperature [° C.] | 30 | 30 |
| Free running distance [mm] | 120 | 120 |
| Pore size [nm] | 100 | 100 |
| Pore structure | spherulite structure | spherulite structure |
| Surface opening ratio [%] | 20 | 20 |
| Water permeability [L/(m2 · h)] | 2,000 | 100 |
| Outside diameter/inside diameter [mm] | 1.2/0.7 | 1.2/0.7 |
| Tensile elongation at break [%] | 40 | 30 |
| (A) Elongation retention after immersion in chemical solution [%] | 85 | 100 |
| (A) Water permeability retention after immersion in chemical solution [%] | 110 | 100 |
| (A) Elongation retention after repeating 10 chemical cleaning cycles | 20 | 60 |

TABLE 1-continued

| | | |
|---|---|---|
| (A) Water permeability retention after repeating 10 chemical cleaning cycles | 180 | 95 |
| (B) Elongation retention after immersion in chemical solution [%] | 75 | 80 |
| (B) Water permeability retention after immersion in chemical solution [%] | 115 | 120 |
| (B) Elongation retention after repeating 10 chemical cleaning cycles | 35 | 35 |
| (B) Water permeability retention after repeating 10 chemical cleaning cycles | 160 | 110 |
| (C) Elongation retention after immersion in chemical solution [%] | 70 | 75 |
| (C) Water permeability retention after immersion in chemical solution [%] | 110 | 100 |
| (C) Elongation retention after repeating 10 chemical cleaning cycles | 40 | 50 |
| (C) Water permeability retention after repeating 10 chemical cleaning cycles | 160 | 120 |
| (D) Elongation retention after immersion in chemical solution [%] | 70 | 80 |
| (D) Water permeability retention after immersion in chemical solution [%] | 110 | 100 |
| (D) Elongation retention after repeating 10 chemical cleaning cycles | 35 | 50 |
| (D) Water permeability retention after repeating 10 chemical cleaning cycles | 160 | 130 |
| Ratio of resin parts of 1 um2 or less by image analysis (1) | 45 | 10 |
| Ratio of resin parts of 1 um2 or less by image analysis (2) | 19 | 19 |
| Ratio of resin parts of 1 um2 or less by image analysis (3) | 10 | 10 |
| Ratio of resin parts of 1 um2 or less by image analysis (4) | 13 | 13 |
| Ratio of resin parts of 10 um2 or more by image analysis (1) | 0 | 87 |
| Ratio of resin parts of 10 um2 or more by image analysis (2) | 75 | 75 |
| Ratio of resin parts of 10 um2 or more by image analysis (3) | 85 | 85 |
| Ratio of resin parts of 10 um2 or more by image analysis (4) | 65 | 65 |
| Retention of water permeation performance [%] | 30 | 30 |
| Filtration test using hollow fiber membrane module (A) Oxidizing agent concentration in filtered water in the filtration step after chemical cleaning step-rinsing step [mg/L] | 3.0 | 2.0 |

It is seen from the results above that a membrane with good continuity is excellent in the chemical resistance and filtration performance and has an enhanced life.

INDUSTRIAL APPLICABILITY

The filtration method according to the present invention uses a membrane having good pore continuity from the inner side of membrane, which is a to-be-treated liquid side of a porous filtration membrane, to the outer side of the membrane, which is a filtrate side, so that in the case of using a strong oxidizing agent such as oxygen-based oxidizing agent having a standard electrode potential of 1 V or more for a cleaning solution (chemical solution) used in the cleaning step, the deterioration of the membrane can be kept to a minimum and excellent chemical resistance and filtration performance and an enhanced life can be achieved. The filtration method according to the present invention can be suitably utilized in a solid-liquid separation operation for separating/removing the suspended matter.

The invention claimed is:

1. A filtration method, comprising:
   (1) passing a to-be-treated liquid containing a to-be-filtered material through a porous membrane composed of a resin having a three-dimensional network structure to separate a filtrate from the to-be-filtered material; and
   (2) passing or soaking the porous membrane into a cleaning solution to clean the inside of the porous membrane; wherein
   on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 0.1 $\mu m^2$ or more and 1 $\mu m^2$ or less is 70% or more relative to the total area of resin parts, the total of areas of resin parts having an area of more than 1 $\mu m^2$ and less than 10 $\mu m^2$ is from 2 to 30% relative to the total area of resin parts, and the total of areas of resin parts having an area of 10 $\mu m^2$ or more is 15% or less relative to the total area of resin parts,
   the cleaning solution contains an oxygen-based oxidizing agent having a standard electrode potential of 1 V or more, and
   the resin constituting the porous membrane is a fluorine resin of a polymer selected from the group consisting of a vinylidene fluoride resin (PVDF), an ethylene-tetrafluoroethylene copolymer (ETFE), and an ethylene-monochlorotrifluoroethylene copolymer (ECTFE),
   wherein the relationship between the tensile elongation at break E0 of the porous membrane before (2) and the tensile elongation at break E1 of the porous membrane after (2) is E1/E0×100≥80%,
   wherein the relationship between the tensile elongation at break E0 of the porous membrane before (2) and the tensile elongation at break EX of the porous membrane after repeating (2) X times (X is an integer of 2 to 100) is EX/E0×100≥70%,
   wherein the relationship between the flux L0 of the porous membrane before (1) and the flux L1 of the porous membrane after (2) is 105%≥L1/L0×100≥95%, and wherein the relationship between the flux L0 of the porous membrane before (1) and the flux LX of the porous membrane after repeating (2) X times (X is an integer of 2 to 100) is 110%≥LX/L0×100≥90%.

2. The filtration method according to claim 1, wherein the surface opening ratio of the porous membrane is from 25 to 60%.

3. The filtration method according to claim 1, wherein the porous membrane is a hollow fiber membrane.

4. The filtration method according to claim 1, wherein the to-be-treated liquid is seawater.

5. The filtration method according to claim 1, wherein the oxygen-based oxidizing agent having a standard electrode potential of 1 V or more is an aqueous Fenton reaction reagent solution by at least one member selected from the group consisting of ozone, hydrogen peroxide, percarbonate, and persulfate.

6. The filtration method according to claim 5, wherein the aqueous Fenton reaction reagent solution contains 0.005 wt % or more of iron(II) ion and 0.5 wt % or more of an oxygen-based oxidizing agent and has a pH of 7 or less.

7. The filtration method according to claim 6, wherein the aqueous Fenton reaction reagent solution contains 0.005 wt % or more of iron(II) ion and 1.0 wt % or more of an oxygen-based oxidizing agent and has a pH of 4 or less.

8. The filtration method according to claim 5, wherein the pH of the aqueous Fenton reaction reagent solution is adjusted with an organic acid.

9. The filtration method according to claim 8, wherein the organic acid is selected from the group consisting of malic acid, oxalic acid, citric acid, tartaric acid, and lactic acid.

10. A method for operating a filtration system, comprising:
(1) passing a to-be-treated liquid containing a to-be-filtered material through a filtration system comprising a reverse osmosis (RO) unit and a microfiltration (MF) or ultrafiltration (UF) unit, the MF or UF unit using a porous membrane composed of a resin having a three-dimensional network structure to separate a filtrate by MF or UF from the to-be-filtered material, in which on an SEM image of a membrane cross-section in the membrane thickness direction perpendicular to an inner surface of the porous membrane, in each region of a total of 4 visual fields with a visual field including the inner surface, a visual field including an outer surface of the membrane, and two visual fields photographed at regular intervals between those visual fields, the total of areas of resin parts having an area of 0.1 μm$^2$ or more and 1 μm$^2$ or less is 70% or more relative to the total area of resin parts, the total of areas of resin parts having an area of more than 1 μm$^2$ and less than 10 μm$^2$ is from 2 to 30% relative to the total area of resin part, the total of areas of resin parts having an area of 10 μm$^2$ or more is 15% or less relative to the total area of resin parts, and the resin constituting the porous membrane is a fluorine resin of a polymer selected from the group consisting of a vinylidene fluoride resin (PVDF), an ethylene-tetrafluoroethylene copolymer (ETFE), and an ethylene-monochlorotrifluoroethylene copolymer (ECTFE); and
(2) purifying the obtained filtrate using the RO unit;
(3) passing or soaking the porous membrane into a cleaning solution to clean the inside of the porous membrane, in which the cleaning solution contains an oxygen-based oxidizing agent having a standard electrode potential of 1.8 V or more; and
(4) rinsing the cleaning solution remaining inside the porous membrane by using 10 L of a rinse water per the membrane area of 1 m$^2$ of the porous membrane until the concentration of the oxygen-based oxidizing agent in the filtrate is 1 mg/L or less,
wherein the relationship between the tensile elongation at break E0 of the porous membrane before (3) and the tensile elongation at break E1 of the porous membrane after (3) is E1/E0×100≥80%,
wherein the relationship between the tensile elongation at break E0 of the porous membrane before (3) and the tensile elongation at break EX of the porous membrane after repeating (3) X times (X is an integer of 2 to 100) is EX/E0×100≥70%,
wherein the relationship between the flux L0 of the porous membrane before (1) and the flux L1 of the porous membrane after (3) is 105%≥L1/L0×100≥95%, and
wherein the relationship between the flux L0 of the porous membrane before (1) and the flux LX of the porous membrane after repeating (3) X times (X is an integer of 2 to 100) is 110%≥LX/L0×100≥90%.

11. The operation method of a filtration system according to claim 10, wherein the surface opening ratio of the porous membrane is from 25 to 60%.

12. The operation method of a filtration system according to claim 10, wherein the porous membrane is a hollow fiber membrane.

13. The operation method of a filtration system according to claim 10, wherein the to-be-treated liquid is seawater.

14. The operation method of a filtration system according to claim 10, wherein the oxygen-based oxidizing agent having a standard electrode potential of 1.8 V or more is an aqueous Fenton reaction reagent solution by at least one member selected from the group consisting of ozone, hydrogen peroxide, percarbonate and persulfate.

15. The operation method of a filtration system according to claim 14, wherein the aqueous Fenton reaction reagent solution contains 0.005 wt % or more of iron(II) ion and 0.5 wt % or more of an oxygen-based oxidizing agent and has a pH of 7 or less.

16. The operation method of a filtration system according to claim 15, wherein the aqueous Fenton reaction reagent solution contains 0.005 wt % or more of iron(II) ion and 1.0 wt % or more of an oxygen-based oxidizing agent and has a pH of 4 or less.

17. The operation method of a filtration system according to claim 14, wherein the pH of the aqueous Fenton reaction reagent solution is adjusted with an organic acid.

18. The operation method of a filtration system according to claim 17, wherein the organic acid is selected from the group consisting of malic acid, oxalic acid, citric acid, tartaric acid, and lactic acid.

19. The operation method of a filtration system according to claim 10, further comprising repeating (1) through (4) at least once.

* * * * *

UNITED STATES PATENT AND TRADEMARK OFFICE
CERTIFICATE OF CORRECTION

PATENT NO. : 11,471,834 B2
APPLICATION NO. : 16/631239
DATED : October 18, 2022
INVENTOR(S) : D. Okamura It is certified that error appears in the above-identified patent and that said Letters Patent is hereby corrected as shown below:

In the Claims

At Column 31, Line 53 (Claim 10), please change "part" to -- parts --.

Signed and Sealed this
Fourteenth Day of February, 2023

*Katherine Kelly Vidal*
*Director of the United States Patent and Trademark Office*